US008532037B2

(12) United States Patent
Xu et al.

(10) Patent No.: US 8,532,037 B2
(45) Date of Patent: Sep. 10, 2013

(54) METHOD AND APPARATUS FOR TRANSMITTING AND RECEIVING MOBILITY INFORMATION SUPPORTING HANDOVER AND/OR ROAMING IN DIGITAL BROADCASTING SYSTEM

(75) Inventors: Yiling Xu, Suwon-si (KR); Jae-Yeon Song, Seoul (KR); Kook-Heui Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 757 days.

(21) Appl. No.: 12/522,029

(22) PCT Filed: Jan. 17, 2008

(86) PCT No.: PCT/KR2008/000300
§ 371 (c)(1),
(2), (4) Date: Jul. 2, 2009

(87) PCT Pub. No.: WO2008/088177
PCT Pub. Date: Jul. 24, 2008

(65) Prior Publication Data
US 2009/0310566 A1    Dec. 17, 2009

(30) Foreign Application Priority Data

Jan. 19, 2007    (KR) .................... 10-2007-0006211

(51) Int. Cl.
*H04L 12/28*    (2006.01)
*H04W 4/00*    (2009.01)
(52) U.S. Cl.
USPC ............ 370/329; 370/254; 370/334; 370/341
(58) Field of Classification Search
None
See application file for complete search history.

(56) References Cited

U.S. PATENT DOCUMENTS

| 7,307,971 | B2 | 12/2007 | Park et al. |
| 2002/0166128 | A1 | 11/2002 | Ikeda et al. |
| 2004/0120285 | A1 | 6/2004 | Paila et al. |
| 2006/0262751 | A1* | 11/2006 | Vermola et al. ............. 370/331 |
| 2007/0050820 | A1* | 3/2007 | Saarikivi et al. ............ 725/62 |

FOREIGN PATENT DOCUMENTS

| RU | 2 265 959 | 12/2005 |
| WO | WO 01/72076 | 9/2001 |
| WO | WO 2004/112417 | 12/2004 |
| WO | WO 2005/034396 | 4/2005 |
| WO | WO 2007/091686 | 8/2007 |
| WO | WO 2007/091868 | 8/2007 |

OTHER PUBLICATIONS

PCT/ISA/220 From Counterpart Application (3PP).
Written Opinion PCT/ISA/237 From Counterpart Application (6PP).
International Search Report PCT/ISA/210 From Counterpart Application (3PP).
Gunther May, "The IP Datacast System—Overview and Mobility Aspects", 2004 IEEE International Symposium on Consumer Electronics, Sep. 3, 2004.

* cited by examiner

*Primary Examiner* — Derrick Ferris
*Assistant Examiner* — Kodzovi Acolatse
(74) *Attorney, Agent, or Firm* — The Farrell Law Firm, P.C.

(57) ABSTRACT

Disclosed is a method and an apparatus for transmitting/receiving mobility information to support the handover and roaming in a digital broadcasting system. The transmission method includes the steps of setting mobility information including information elements for indicating at least one handover/roaming type according to whether or not support of an interactive network is available for handover/roaming; inserting the mobility information into at least one of an ESG regarding broadcasting services, a notification message, and an independent signaling message so that the mobility information is transmitted to at least one terminal; and conducting handover or roaming of the terminal according to the mobility information.

24 Claims, 18 Drawing Sheets

METHOD AND APPARATUS FOR TRANSMITTING AND RECEIVING MOBILITY INFORMATION SUPPORTING HANDOVER AND/OR ROAMING IN DIGITAL BROADCASTING SYSTEM

PRIORITY

This application claims priority to Korean Patent Application Serial No. 10-2007-0006211 filed Jan. 19, 2007; and to International Application PCT/KR2008/000300 filed Jan. 17, 2008; the contents of each of which are incorporated herein by reference.

BACKGROUND OF THE INVENTION

1. Field of the Invention

The present invention relates to a digital broadcasting system, and more particularly to a method and an apparatus for transmitting/receiving mobility information to support the handover and roaming in a CBMS (Convergence of Broadcasting and Mobile Services) system.

2. Description of the Related Art

As generally known in the art, mobile broadcasts are recently provided by broadcasting systems or mobile communication systems in line with the development of communication and broadcasting technology. There are also discussions about mobile broadcasts that can transmit packet data through broadcasting channels, besides conventional broadcasting services that are limited to sounds and images. Mobile broadcasts are provided through a sequence of operations including the discovery of a service by a mobile terminal (e.g. mobile telephone, laptop computer, PDA) capable of receiving mobile broadcasts, subscription to the service by the mobile terminal, provision of various types of control information necessary to receive the service, transmission of the service, and reception of the service by the mobile terminal.

The OMA (Open Mobile Alliance) is one of the groups that are studying standards for the interworking between separate mobility solutions, and is mainly in charge of establishing various application standards regarding mobile games, Internet services, etc. One of the working groups of the OMA, particularly a sub-working group of the OMA BAC (Browse and Content) BCAST (Mobile Broadcast) is studying technology for the convergence of broadcasting and mobile services (CBMS) using mobile terminals capable of communicating with interactive networks. In addition, the DVB-CBMS (Digital Video Broadcasting-Convergence of Broadcasting and Mobile Services), one of the organizations for standards regarding mobile broadcasts based on mobile terminals, is defining the system structure, interface, etc., which are necessary for the CBMS.

In general, terminals adapted to receive broadcasting services in a mobile broadcasting system receive an ESG (Electronic Service Guide), which includes information regarding the service itself, billing, and method for receiving the service, and then receive a desired service by using the ESG.

When a terminal in a mobile broadcasting system moves from a home network (i.e. network of the home service provider to which the terminal user has subscribed) to a visited network (i.e. network of a foreign service provider), the user wants to receive broadcasting services from the home network or services from the foreign service provider, which has a roaming agreement with the home service provider, by using the terminal carried with him/her. This procedure is called roaming. When the terminal moves from the home network to the visited network while receiving a broadcasting service, the user wants to receive the broadcasting service seamlessly through the terminal. This procedure is called a handover.

However, conventional CBMS systems do not provide a definite procedure for the roaming and handover of broadcasting services. Therefore, technology for efficiently providing the roaming and handover of broadcasting services in a mobile broadcasting system is necessary.

SUMMARY OF THE INVENTION

Accordingly, the present invention has been made to solve the above-mentioned problems occurring in the prior art, and it is an aspect of the present invention to provide a method and an apparatus for transmitting information regarding the type and execution of a handover and roaming by using mobility information for supporting the handover and roaming of a terminal adapted to receive a broadcasting service.

It is another aspect of the present invention to provide a method and an apparatus for transmitting/receiving mobility information regarding a handover and roaming to support the handover and roaming in a CBMS system.

It is a further aspect of the present invention to provide a method and an apparatus for transmitting/receiving mobility information regarding a handover and roaming by using an ESG for broadcasting services, a notification message, or other signaling means.

In order to accomplish these aspects of the present invention, there is provided a method for transmitting handover-related information for a terminal in a CBMS system, the method including the steps of setting handover-related information including information elements for indicating at least one available handover type; inserting the handover-related information into an ESG regarding broadcasting services so that the handover-related information is transmitted to a terminal; and conducting handover of the terminal according to the handover-related information.

In accordance with another aspect of the present invention, there is provided a method for receiving handover-related information for a terminal in a CBMS system, the method including the steps of receiving an ESG regarding broadcasting services from a network; detecting handover-related information including information elements for indicating at least one available handover type from the ESG; and conducting handover of the terminal according to the handover-related information.

In accordance with a further aspect of the present invention, there is provided an apparatus for transmitting handover-related information for a terminal in a CBMS system, the apparatus including a handover control entity for setting handover-related information including information elements for indicating at least one available handover type; an ESG entity for inserting the handover-related information into an ESG regarding broadcasting services so that the handover-related information is transmitted to a terminal; and a mobility management block for conducting handover of the terminal according to the handover-related information.

In accordance with a still further aspect of the present invention, there is provided an apparatus for receiving handover-related information for a terminal in a CBMS system, the apparatus including a receiver for receiving an ESG regarding broadcasting services from a network; and a mobility management block for detecting handover-related information including information elements for indicating at least one available handover type from the ESG and conducting handover of the terminal according to the handover-related information.

The present invention is advantageous in that, by providing a terminal adapted to receive broadcasting services with mobility information necessary for the handover/roaming of the terminal by means of an ESG, a notification message, or other signaling means in advance, an efficient handover is supported.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein is omitted to avoid making the subject matter of the present invention unclear. The terminology used herein is defined based on consideration of relevant functionality according to the present invention, and may vary depending on the intention or practice of the user or operator. Therefore, the definition must be understood based on the overall context of the specification.

The gist of the present invention will be described briefly. When a broadcast receiver (i.e. terminal) in a CBMS system moves from a home network to a visited network, or from the service region of a home service provider to that of a foreign service provider, mobility information regarding the handover and/or roaming (hereinafter, referred to as handover/roaming) is provided by the home service provider, which the terminal can access, before the handover or roaming occurs.

Figure 1:
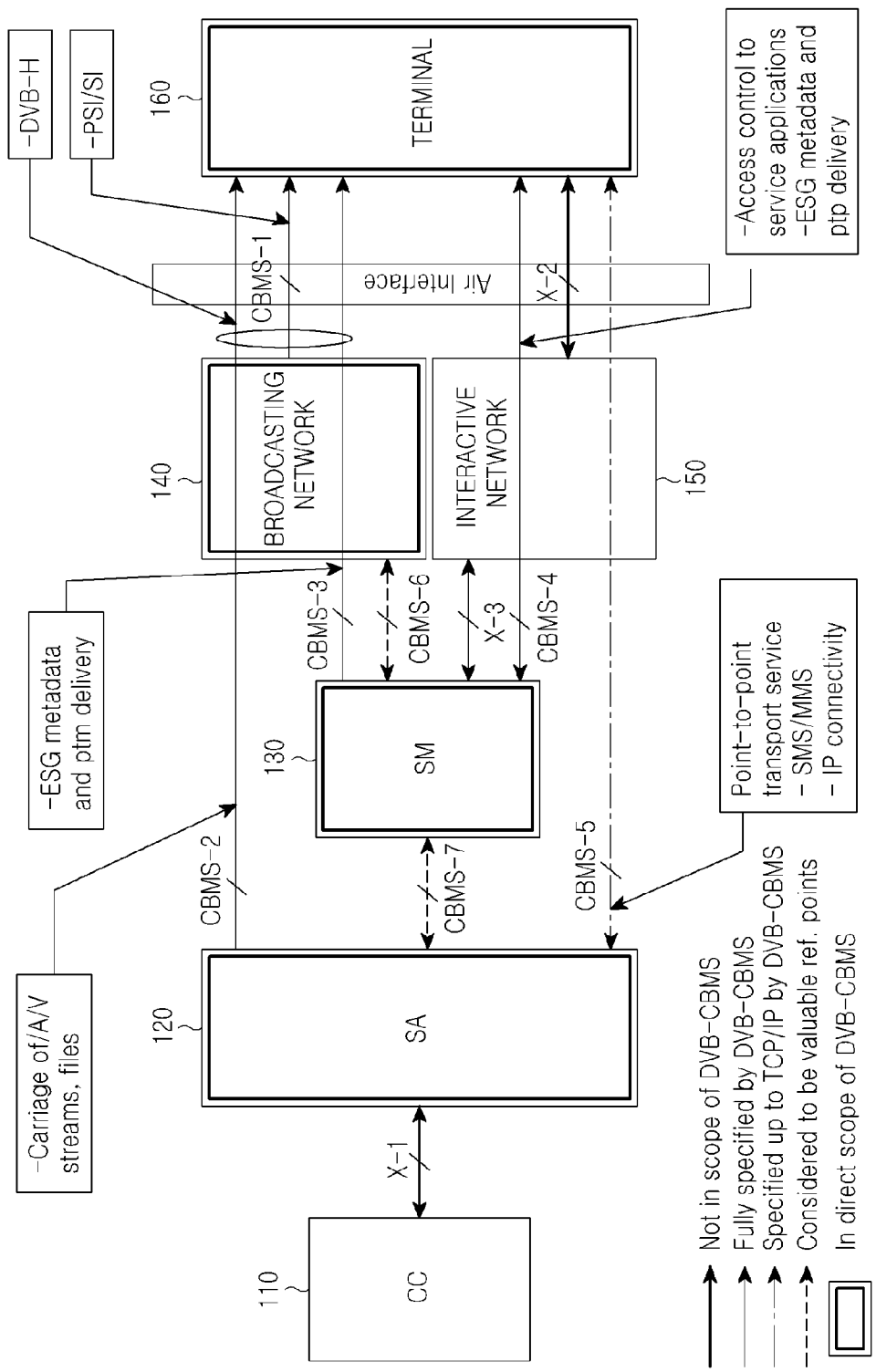
FIG. 1 is a block diagram showing a CBMS structure according to an exemplary embodiment of the present invention.

FIG. 1 is a block diagram showing the structure of a CBMS system according to an exemplary embodiment of the present invention. Particularly, FIG. 1 shows logical entities for fulfilling functions necessary for the IPDC (Internet Protocol Data Cast) based on DVB-H (Digital Video Broadcasting-Handheld). The entities are separately shown according to the difference in major functions, and may be positioned in physically separated servers or in the same server.

Referring to FIG. 1, the CC (Content Creation) block 110 creates a content source of a broadcasting service and sends it to the SA (Service Application) block 120. The SA block 120 aggregates contents from the CC block 110 and relevant metadata additionally needed for service configuration, and creates service data regarding a specific service. The SA block 120 encodes the contents in a format that the terminal can understand, and provides them by using either streaming or file carousel delivery. The SA block 120 creates service description metadata to be used by the ESG To this end, the SA block 120 includes a number of sub-entities for managing different applications for respective services of the IPDC.

The SM (Service Management) block 130 is adapted for service configuration, resource allocation, ESG provisioning, security, etc. between the SA block 120 and the terminal 160.

The broadcasting network 140 refers to a network for transmitting broadcasting service data, such as a DVB-H system. The interactive network 150 refers to a conventional cellular mobile communication network, such as UMTS (Universal Mobile Telecommunications System) based on 3GPP ($3^{rd}$ Generation Partnership Project), IMT (International Mobile Telecommunications)-2000 based on 3GPP2, or Wibro (Wireless Broadband). Any type of network may constitute the interactive network 150, as long as it can receive information or a request from the terminal 160 and transmit a response to the information or request. The broadcasting network 140 and the interactive network 150 function as transmission bearers in the CBMS system. The terminal 160 refers to user equipment, i.e. a receiver adapted to access the interactive network 150 and receive a broadcasting service from the broadcasting network 140. In the CBMS system, the terminal 160 receives service data and signaling information from the broadcasting network, and interacts with the interactive network 150 to exchange service data and signaling information.

The interfaces between respective entities, including the above-mentioned logical entities, will now be described.

The interfaces X-1, X-2, and X-3 correspond to reference points between the broadcasting network and different entities, and may be omitted in the case of an interactive standard based on DVB-H. Particularly, the interface X-1 connects between the CC block 110 and the SA block 120, the interface X-2 connects between the interactive network 150 and the terminal 160, and the interface X-3 connects between the SM Block 130 and the interactive network 150.

The interface CBMS-1 delivers broadcasting-related signaling. The interface CBMS-2 delivers contents such as audios, videos, files, etc. The interface CBMS-3 delivers an ESG The interface CBMS-4 delivers an ESG in a PtP (Point-to-Point) transmission type. The interface CBMS-5 delivers an SMS (Short Message Service), an MMS (Multimedia Message Service), etc. in the PtP transmission type. The interface CBMS-6 delivers configuration parameters, including the number of services, the allocated bandwidth, etc., for DVB-H transmission. The interface CBMS-7 delivers a service application announcement or metadata. Those skilled in the art can understand that, although typical functions of respective interfaces have been described, this description does not limit the functionality of respective interfaces.

Figure 2:
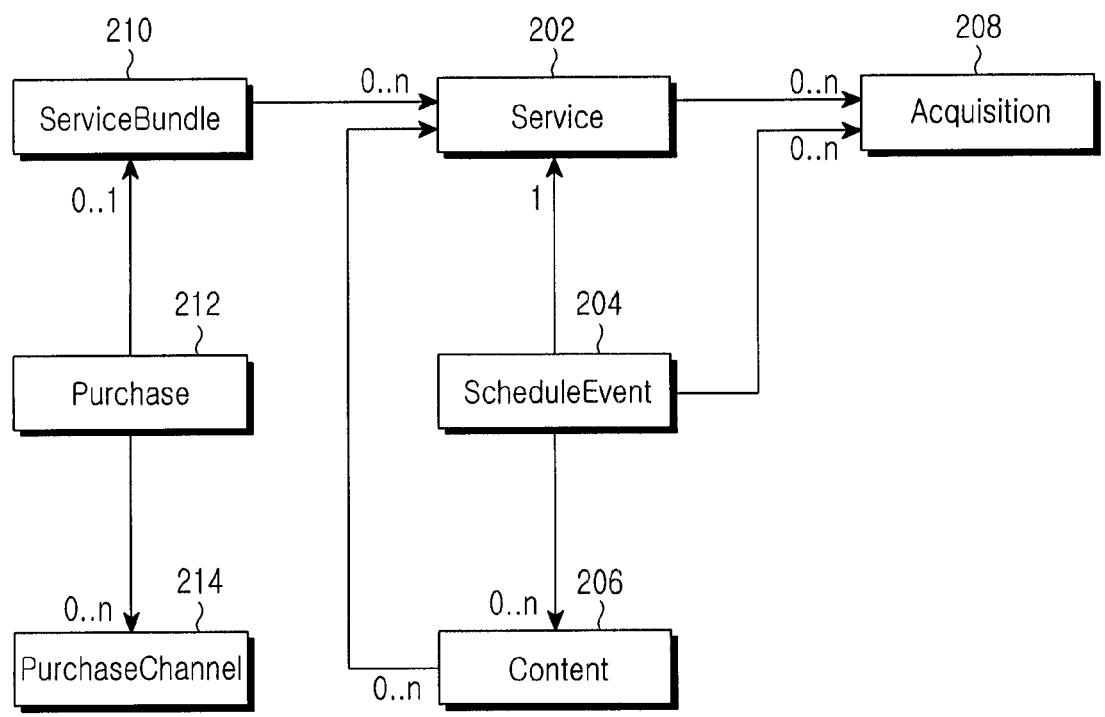
FIG. 2 shows a data model of an ESG according to an exemplary embodiment of the present invention.

FIG. 2 shows a data model of an ESG according to an exemplary embodiment of the present invention.

Referring to FIG. 2, respective blocks shown in the drawing correspond to fragments of ESG data. Particularly, the ESG data model includes a service fragment 202, a schedule event fragment 204, a content fragment 206, an acquisition fragment 208, a service bundle fragment 210, a purchase fragment 212, and a purchase channel fragment 214.

The service fragment 202 contains an overall description of the service. The schedule event fragment 204 contains information regarding the service in terms of time. The acquisition fragment 208 contains service access information necessary to receive service data. The service bundle fragment 210 contains information regarding cases of combining different services into a service bundle. The purchase fragment 212 contains price information necessary to purchase the service bundle. The fragment channel fragment 214 contains information regarding a system necessary to acquire the right to purchase.

Each fragment of the data model can refer to other fragments, and the arrows between the fragments indicate such reference. As used herein, the reference means that the current fragment gives information regarding it by using information transmitted by other fragments. More particularly, when a service consists of different contents, the service fragment 202 contains an overall description of the service, such as the name and language of the service, but has no description of the contents transmitted in connection with the service. Instead, the content fragment 206 of the corresponding contents refers to the service fragment. In order to obtain various pieces of information necessary for the terminal to receive the service, such as information regarding the session used for the transmitted protocol, the acquisition fragment 208, to which the service fragment 202 is referring, is received and decoded to obtain such information.

The ESG data is separately transmitted to the terminal by using at least one IP (Internet Protocol) stream at a time different from that at which the data stream is transmitted. Therefore, the service supplier can provide information, which the user needs to know before receiving the service, by using the ESG data model before transmission of the service. By receiving the ESG stream, the terminal can acquire information necessary to receive services from the service supplier. When the user selects a specific service, the terminal accesses a data stream, which transmits the service, by using the acquired information, and receives data. The information necessary for the terminal to access the service data stream is transmitted through the acquisition fragment 208, as has been described with reference to FIG. 1.

The fragments of the ESG data model are grouped into a number of sets, which are contained in separate containers. Each container is considered as an object in the FLUTE (File Delivery over Unidirectional Transport protocol) session and is transmitted.

When a handover is necessary in the CBMS system, different types of handover can be used depending on different conditions. For example, either a passive handover or an active handover is used according to whether or not an interactive channel is available. In this case, either signaling or a service is delivered through the interactive channel according to whether signaling information or service data can be transmitted through the interactive channel. Furthermore, either a network control handover or a terminal control handover is used according to whether the network or the terminal decides the handover.

It is impossible for the terminal to know the entire handover/roaming procedure instantly without any preceding condition information, so it becomes necessary to communicate with the network to obtain information regarding the handover/roaming type (hereinafter, referred to as mobility information). Therefore, according to an exemplary embodiment of the present invention, the mobility information is added to an ESG regarding a broadcasting service. The terminal obtains the mobility information from the ESG before a handover actually occurs, and properly determines the point of time, at which the handover/roaming is necessary, and the handover/roaming type based on the mobility information and other condition information obtained from the ESG The following Table 1a discloses handover types, which the mobility information can indicate, together with their descriptions.

TABLE 1a (Handover types)

| No | Handover type | Description |
|---|---|---|
| 1 | Passive handover | 1. Terminal control |
| 2 | Terminal control active handover with assistant signaling | Terminal control<br>Interactive network is available<br>Terminal can acquire handover-related information over interactive network<br>Interactive network type |
| 3 | Terminal control active handover with service delivery over interactive network | Terminal control<br>Interactive network is available<br>Terminal can receive service over interactive network<br>Interactive network type |
| 4 | Terminal control active handover with assistant signaling and service delivery over interactive network | Terminal control<br>Interactive network is available<br>Terminal can acquire handover-related information over interactive network<br>Terminal can receive service over interactive network<br>Interactive network type |

TABLE 1a-continued (Handover types)

| No | Handover type | Description |
|---|---|---|
| 5 | Network control handover | Network control<br>Interactive network is available<br>Network supports handover over interactive network<br>Interactive network type |
| 6 | Network control handover with service delivery over interactive network | Network control<br>Interactive network is available<br>Network supports handover over interactive network<br>Service can be delivered to terminal over interactive network<br>Interactive network type |
| 7 | Both terminal control and network control handover are optional | Both terminal control and network control are optional<br>Interactive network is available<br>Network supports handover over interactive network<br>Interactive network type |
| 8 | Both terminal control and network control handover are optional with service delivery over interactive network | Both terminal control and network control are optional<br>Interactive network is available<br>Network supports handover over interactive network<br>Service can be delivered to terminal over interactive network<br>Interactive network type |

In the case of roaming, various roaming types can be used depending on conditions similar to those of the handover. The following Table 1b discloses roaming types, which the mobility information can indicate, together with their descriptions.

Those skilled in the art can easily understand that, although various types of handover/roaming are disclosed in Tables 1a and 1b, the present invention is also applicable to handover/roaming types other than those disclosed herein. In addition, TABLE 1b (roaming types)

| No | Roaming type | Description |
|---|---|---|
| 1 | Passive roaming | 1. Terminal control |
| 2 | Terminal control active roaming with assistant signaling | Terminal control<br>Interactive network is available<br>Terminal can acquire roaming-related information over interactive network<br>Interactive network type |
| 3 | Terminal control active roaming with service delivery over interactive network | Terminal control<br>Interactive network is available<br>Terminal can receive service over interactive network<br>Interactive network type |
| 4 | Terminal control active roaming with assistant signaling and service delivery over interactive network | Terminal control<br>Interactive network is available<br>Terminal can acquire roaming-related information over interactive network<br>Terminal can receive service over interactive network<br>Interactive network type |
| 5 | Network control roaming | Network control<br>Interactive network is available<br>Network supports roaming over interactive network<br>Interactive network type |
| 6 | Network control roaming with service delivery over interactive network | Network control<br>Interactive network is available<br>Network supports roaming over interactive network<br>Service can be delivered to terminal over interactive network<br>Interactive network type |
| 7 | Both terminal control and network control roaming are optional | Both terminal control and network control are optional<br>Interactive network is available<br>Network supports roaming over interactive network<br>Interactive network type |
| 8 | Both terminal control and network control roaming are optional with service delivery over interactive network | Both terminal control and network control are optional<br>Interactive network is available<br>Network supports roaming over interactive network<br>Service can be delivered to terminal over interactive network<br>Interactive network type | detailed parameters and information elements related to the mobility information (described later) are variable depending on the system or service, to which they are applied, or other handover/roaming types.

The mobility information may directly indicate the handover/roaming type. Alternatively, the mobility information may combine and use at least one information element to indicate the handover/roaming type and information necessary to conduct the handover/roaming.

Figure 3A:
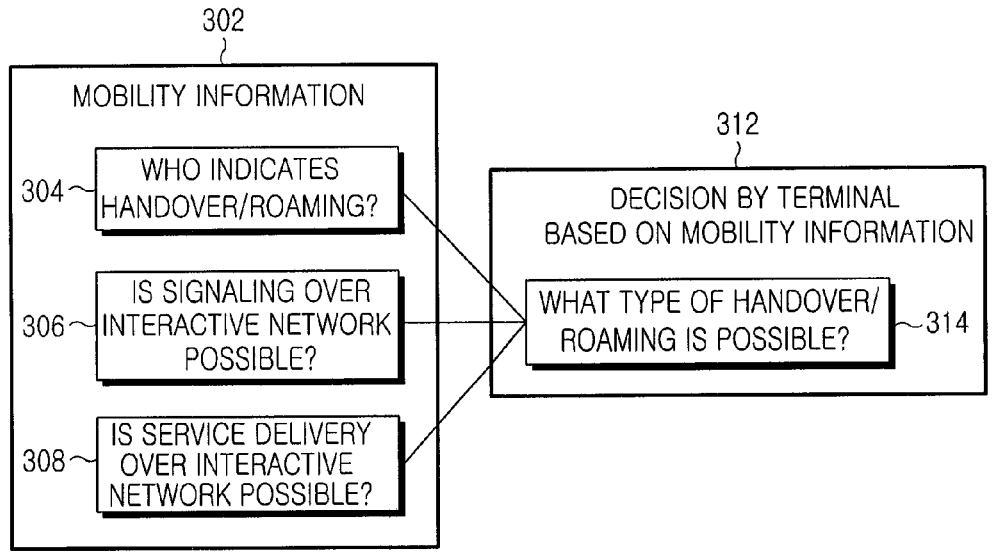
FIGS. 3a and 3B show types of indication by mobility information according to an exemplary embodiment of the present invention.

FIG. 3a shows a type of indication by mobility information according to an exemplary embodiment of the present invention. As shown, the mobility information 302 includes a first information element 304 indicating who controls the handover/roaming, a second information element 306 indicating whether or not signaling over the interactive network is available, and a third information element 308 indicating whether or not service delivery over the interactive network is available. Based on the received mobility information 302, the terminal 312 decides what type of handover/roaming is to be conducted.

Figure 3B:
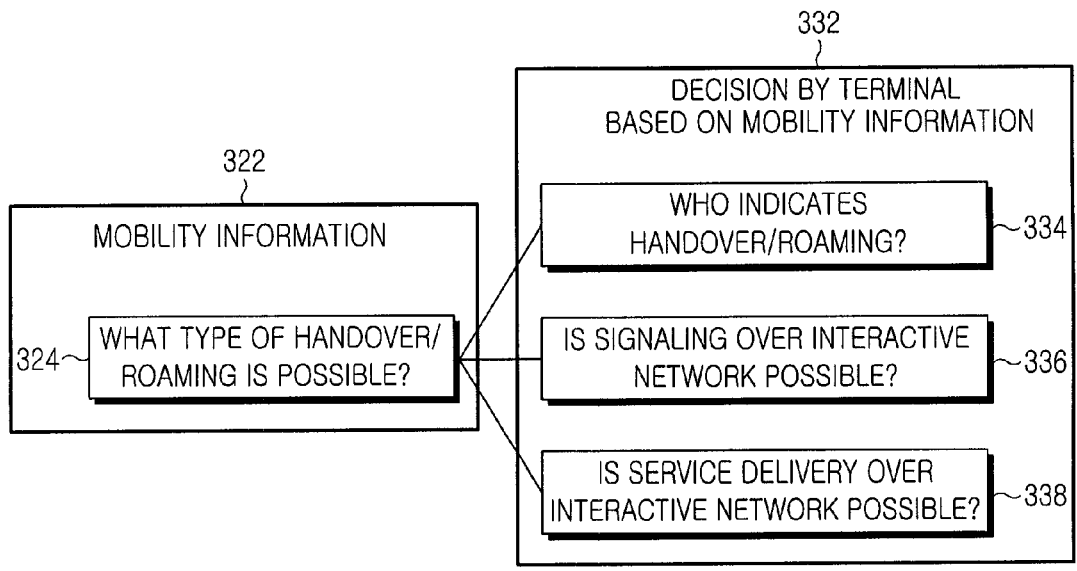

FIG. 3b shows a type of indication by mobility information according to another embodiment of the present invention. As shown, the mobility information 322 directly indicates what type of handover/roaming is to be conducted 324. Based on the received mobility information 322, the terminal 332 recognizes detailed conditions, including who controls the handover/roaming 334, whether or not signaling over the interactive network is available 336, and whether or not service delivery over the interactive network is available 338.

The mobility information can be delivered by means of an ESG or a notification message, which is used in mobile broadcasting systems. Alternatively, independent signaling may be used to deliver the mobility information. Such a notification message is used to notify terminals of particulars of change in the service, contents, or operations in broadcasting systems.

In order to deliver the mobility information, for example, an EventType field is used in the header of the notification message (hereinafter, referred to as a notification header). The following Table 2a shows the content of the EventType field for indicating the handover type.

TABLE 2a (header of notification message)

| EventType | Content |
|---|---|
| Handover | Handover type:<br>1. terminal control handover<br>   1.1. with service delivery over interactive network<br>   1.2. without service delivery over interactive network<br>2. terminal control with network assistant<br>   2.1. with service delivery over interactive network<br>   2.2. without service delivery over interactive network<br>3. both terminal could network control are available<br>   3.1. with service delivery over interactive network<br>   3.2. without service delivery over interactive network<br>4. network control<br>   4.1. with service delivery over interactive network<br>   4.2. without service delivery over interactive network<br>Handover related information:<br>For example, if interactive network is available, its type, provider, address and so on could be provided here. |

The following Table 2b shows another embodiment of using some bits in the EventType field to indicate the handover type.

TABLE 2b (header of notification message)

| EventType | Bits in content | Description |
|---|---|---|
| Handover | 2 | 00: terminal control<br>01: network control<br>10: both terminal and network control are available |
|  | 1 | 0: signaling over interactive network is not available<br>1: signaling over interactive network is available |
|  | 1 | 0: service delivery over interactive network is not available<br>1: service delivery over interactive network is available |

When the notification header of the notification message has no EventType field, handover/roaming-related information is directly indicated by the content of the notification message, as shown in the following Table 3a.

TABLE 3a (notification message)

| Content | |
|---|---|
| Handover information carried in notification | Handover type:<br>1. terminal control handover<br>   1.1. with service delivery over interactive<br>   1.2. without service delivery over interactive network<br>2. terminal control with network assistant<br>   2.1. with service delivery over interactive network<br>   2.2. without service delivery over interactive network<br>3. both terminal could network control are available<br>   3.1. with service delivery over interactive network<br>   3.2. without service delivery over interactive network<br>4. network control<br>   4.1. with service delivery over interactive network<br>   4.2. without service delivery over interactive network<br>Handover related information:<br>For example, if interactive network is available, its type, provider, address and so on could be provided here. |

The following Table 3b shows another embodiment of using some bits in the notification message to indicate the handover type.

TABLE 3b (notification message)

| | Bits in content | Description |
|---|---|---|
| Handover information carried in notification | 2 | 00: terminal control<br>01: network control<br>10: both terminal and network control are available |
|  | 1 | 0: signaling over interactive network is not available<br>1: signaling over interactive network is available |
|  | 1 | 0: service delivery over interactive network is not available<br>1: service delivery over interactive network is available |

The following Table 4a shows a format when an independent signaling message (hereinafter, referred to as a handover signaling message) is used to deliver handover/roaming-related information. Particularly, the header of the handover signaling message indicates handover types.

TABLE 4a (handover signaling message)

| Header | Content |
|---|---|
| Handover signaling | Handover type:<br>  1. terminal control handover<br>    1.1. with service delivery over interactive network<br>    1.2. without service delivery over interactive network<br>  2. terminal control with network assistant<br>    2.1. with service delivery over interactive network<br>    2.2. without service delivery over interactive network<br>  3. both terminal could network control are available<br>    3.1. with service delivery over interactive network<br>    3.2. without service delivery over interactive network<br>  4. network control<br>    4.1. with service delivery over interactive network<br>    4.2. without service delivery over interactive network<br>Handover related information:<br>For example, if interactive network is available, its type, provider, address and so on could be provided here. |

The following Table 4b shows another embodiment of using a handover signaling message to deliver handover/roaming-related information. Particularly, some bits in the handover signaling message indicate handover types.

TABLE 4b (handover signaling message)

| Header | Bits in content | Description |
|---|---|---|
| Handover signaling | 2 | 00: terminal control<br>01: network control<br>10: both terminal and network control are available |
| | 1 | 0: signaling over interactive network is not available<br>1: signaling over interactive network is available |
| | 1 | 0: service delivery over interactive network is not available<br>1: service delivery over interactive network is available |

The following Table 5a shows a format of mobility information added to the ESG according to a first embodiment of the present invention. Those skilled in the art can easily understand that, although handover-related information is solely shown for convenience of description, the ESG also contains roaming-related information in a similar format. The present invention is not limited to the details described below, and more related information can be added depending on the relevant standards, system design, and the needs of network operators.

TABLE 5a (handover-related information 1)

```
<element name="Handover">
 <complexType>
  <sequence>
   <element name="HandoverControl">
    <complexType>
     <complexContent>
      <extension base="HandoverCotrolType">
       <attribute name="type" type="HandoverCotrolType"/>
      </ extension>
     </ complexContent>
    </ complexType>
   </ element>
   <element name="InteractiveNetworkType" type="InteractiveNetwork" minOccurs="0"/>
   <element name="RelatedMaterial" type="anyURI" minOccurs="0"/>
  </ sequence>
  <attribute name="SignalingOverInteractiveNetwork" type="xs:boolean" use="optional"/>
  <attribute name="ServiceDeliveryOverInteractiveNetworkHandover" type=" boolean" use="optional"/>
 </ complexType>
</ element>
<simpleType name="HandoverCotrolType">
 <restriction base="string">
  <enumeration value="terminal control"/>
  <enumeration value="both terminal and network control are optional"/>
  <enumeration value="network control"/>
 </ restriction>
</ simpleType><complex Type name=" handover " >
 <sequence>
  <element name=" HandoverControlType" type=" esg: HandoverControlType" >
  <element name=" InteractiveNetwork" type=" esg: InteractiveNetwork" >
  <element name=" RelatedMaterial" type=" anyURI" >
  <sequence>
   <attribute name=" Signaling over interactive network" type=" Boolean" use=" optional" />
   <attribute name=" Service delivery over interactive network handover" type=" Boolean" use=" optional" />
</complex type>
```

The following Table 5b shows another format of handover-related information contained in the ESG.

TABLE 5b (handover-related information 2)

```
<element name="Handover">
 <complexType>
 <sequence>
   <element name="HandoverControl" type="HandoverCotrolType"/>
   <element name="InteractiveNetworkType"
   type="InteractiveNetwork" minOccurs="0"/>
   <element name="RelatedMaterial" type="anyURI" minOccurs="0"/>
 </ sequence>
 <attribute name="SignalingOverInteractiveNetwork"
 type="xs:boolean" use="optional"/>
 <attribute  name="ServiceDeliveryOverInteractiveNetworkHandover"
 type=" boolean" use="optional"/>
 </ complexType>
</ element>
<complexType name="HandoverCotrolType">
 <choice minOccurs="0"/>
   <element name="terminalControl" type="string" fixed="terminal
   control"/>
   <element name=" BothTerminalAndNetworkControlAreOptional"
   type="string" fixed=" both
terminal and network control are optional "/>
   <element name="networkControl" type="string" fixed="network
   control"/>
 </choice>
</ complexType >
```

The following Table 5c shows a still another format of handover-related information contained in the ESG.

TABLE 5c (handover-related information 3)

```
<element name="Handover">
 <complexType>
  <sequence>
    <element name="HandoverControl" type="tva:ControlledTermType"
    minOccurs="0"/>
    <element name="InteractiveNetworkType"
    type="InteractiveNetwork" minOccurs="0"/>
    <element name="RelatedMaterial" type="anyURI" minOccurs="0"/>
  </ sequence>
  <attribute name="SignalingOverInteractiveNetwork"
  type="xs:boolean" use="optional"/>
  <attribute   name="ServiceDeliveryOverInteractiveNetworkHandover"
type=" boolean" use="optional"/>
  </ complexType>
</ element>
```

The information element "handover" in the above Tables 5a-5c represents handover-related information and includes information elements "HandoverControlType" and "InteractiveNetwork" (or "InteractiveNetworkType"). In addition, the information element "handover" includes optional attribute values "Signaling over interactive network" and "Service delivery over interactive network". The information element "handover" may also include information element "RelatedMaterial" indicating the address of a server, from which additional handover-related information can be obtained, in the URL (Uniform Resource Locator) type.

The information element "HandoverControlType" is of the Boolean type, and designates the type of handover control. For example, it indicates that "terminal control handover is mandatory" or that "network control handover is mandatory". In addition, the information element "HandoverControlType" may indicate that "both terminal and network control handover are optional". The following Table 6 shows the detailed format of the "HandoverControlType".

TABLE 6

(handover control type)

```
<ClassificationScheme uri="urn:dvb:ipdc:esg:cs:HandoverControlTypeCS:>
<Term termID="1.0"<Name xml:lang="en"> Handover Control Type</Name>
 <Definition xml:lang="en">Type of handover control, e.g. terminal control handover is mandatory, both
terminal and network control handover are optional, network control handover is mandatory</Definition>
  <Term termID="1.1>
   <Name xml:lang="en"> terminal control handover </Name>
   <Definition xml:lang="en">A terminal control handover </Definition>
 <Term termID="1.2>
   <Name xml:lang="en"> both terminal and network control handover are optional </Name>
   <Definition xml:lang="en"> both terminal and network control handover are optional </Definition>
<Term termID="1.3>
  <Name xml:lang="en"> network control handover </Name>
  <Definition xml:lang="en">A network control handover </Definition>
<ClassificationScheme uri="urn:dvb:ipdc:esg:cs:MobilityCS">
  <Term termID="1">
   <Name xml:lang="en">HandoverCotrolType</Name>
   <Definitionxml:lang="en">Type of handover control, e.g. terminal control handover is mandatory,
both terminal and network control handover are optional, network control handover is mandatory
   </Definition>
     <Term termID="1.1">
      <Namexml:lang="en"> terminal control</Name>
      <Definition xml:lang="en">A terminal control handover </Definition>
     </Term>
     <Term termID="1.2">
      <Namexml:lang="en"> both terminal and network control are optional </Name>
      <Definition xml:lang="en"> both terminal and network control handover are optional </Definition>
     </Term>
```

TABLE 6-continued (handover control type)

```
  <Term termID="1.3">
    <Namexml:lang="en"> network control</Name>
    <Definition xml:lang="en">A network control handover </Definition>
  </Term>
 </Term>
</ClassificationScheme>
```

The information element "InteractiveNetwork" designates the characteristics of the interactive network that supports a handover, and includes the URI (Uniform Resource Identifier) of the interactive network provider, the type of the interactive network, the acquisition reference which represents an access parameter, the IP address of the interactive network, and its port number. The information element "InteractiveNetwork" exists when the interactive network is available.

TABLE 7a (interactive network information)

```
<complexType name="InteractiveNetwork">
 <all>
  <element name="InteractiveNetworkProvider" type="InteractiveNetwork ProviderType"/>
  <element name="InteractiveNetwork">
   <complexType>
    <complexContent>
     <extension base="InteractiveNetworkType">
      <attribute name="type" type="InteractiveNetworkType"/>
     </ extension>
    </ complexContent>
   </ complexType>
  </ element>
  <element name="AcquisitionRef" type="anyURI"/>
  <element name="interactiveNetworkIPAddress" type="anyURI"/>
  <element name="InteractiveNetworkPortNumber" type="anyURI"/>
 </ all>
</ complexType>
<complexType name="InteractiveNetworkProviderType">
 <sequence>
  <element name="ProviderURI" type="anyURI"/>
  <element name="ProviderName" type="mpeg7:TextualType" minOccurs="0"/>
  <element name="ProviderLogo" type="mpeg7:TitleMediaType" minOccurs="0"/>
  <element name="ProviderID" type="positiveInteger" minOccurs="0"/>
  <element name="ProviderInformationURL" type="anyURI" minOccurs="0"/>
  <element name="PrivateAuxiliaryData" type="anyType" minOccurs="0"/>
 </ sequence>
</  complexType><complex   Type   name="interactive   network"minOccurs   =
"0"maxOccurs="unbounded"/>
<all>
 <element name="InteractiveNetworkProvider"type= "anyURIHandoverControlType">
 <element name="InteractiveNetwork" type="esg: InteractiveNetworkType">
 <element name="AcquisitionRef"type="anyURI">
 <element name="InteractiveNetworkIPAddress"type="anyURI">
 <element name="InteractiveNetworkPortNumber"type="anyURI">
 </all>
</complex type>
```

The "InteractiveNetworkType" specified by the information element "InteractiveNetwork" may be, for example, 3GPP, 3GPP2, WLAN (Wireless Local Area Network), WiBro (Wireless Broadband), etc. The following Table 7b enumerates a number of possible interactive network types.

TABLE 7b (interactive network types)

```
<simpleType name="InteractiveNetworkType">
 <restriction base="string">
  <enumeration value="3GPP"/>
  <enumeration value="3GPP2"/>
  <enumeration value="WLAN"/>
```

TABLE 7b-continued (interactive network types)

```
  <enumeration value="WIBRO"/>
 </restriction>
</simpleType>
```

When the "Signaling over interactive network" in Table 5 is set to be "true", it means that signaling over the interactive network is possible, and, when set to be "false", it means that signaling over the interactive network is not possible. Similarly, when the "Service delivery over interactive network" is set to be "true", it means that service data delivery over the interactive network is possible, and, when set to be "false", it means that service data delivery over the interactive network is not possible.

According to another embodiment of the present invention, the mobility information is inserted into a service fragment of the ESG. The following Table 8a shows fields inserted into the service fragment in connection with the mobility information.

TABLE 8a

| Field name | Meaning |
| --- | --- |
| HandoverControlType | Indicates handover control type. For example, indicates if terminal control handover is mandatory, if network control handover is mandatory, or if terminal/network control handover is optional, etc. |
| InteractiveNetwork | Indicates interactive network characteristics. For example, interactive network indictor, type, access parameter, etc. Exists only if interactive network is available. |
| RelatedMaterial | Indicates reference information regarding handover-related materials. For example, IP platform, information provider, service identifier, signal frequency, cell information, etc. |
| Signaling over interactive network | If set to be "true", it means that signaling over interactive network is possible; if set to be "false", it means that signaling over interactive network is not possible. |
| Service delivery over interactive network handover | If set to be "true", it means that service data delivery over interactive network is possible; if set to be "false", it means that service data delivery over interactive network is not possible. |

For example, the fields of the Table 8a have formats as shown in the following Table 8b.

TABLE 8b

```
<element name="Handover">
 <complexType>
  <sequence>
   <element name="InteractiveNetworkType" type="InteractiveNetwork" minOccurs="0"/>
   <element name="RelatedMaterial" type="anyURI" minOccurs="0"/>
  </ sequence>
  <attribute name="SignalingOverInteractiveNetwork" type="xs:boolean" use="optional"/>
  <attribute  name="ServiceDeliveryOverInteractiveNetworkHandover"  type="  boolean" use="optional"/>
  <attribute name="NetworkControlAbailabilty" type="xs:boolean" use="optional"/>
  <attribute name="NetworkControlIsMandatory" type="xs:boolean" use="optional"/>
 </s:complexType>
</ element><complex Type name="handover "
<sequence>
 <element name="InteractiveNetwork"type="esg: InteractiveNetwork">
 <element name="RelatedMaterial" type="anyURI">
<sequence>
 <attribute name="signaling over interactive network" type="Boolean" use="optional"/>
 <attribute name="service delivery over interactive network" type="Boolean" use="optional"/>
 <attribute name="network control availability" type="Boolean" use="optional"/>
 <attribute name="network control is mandatory" type="Boolean" use="optional"/>
</complex type>
```

The following Table 9 shows another format of handover-related information contained in the service fragment.

TABLE 9

| Field name | Meaning |
| --- | --- |
| InteractiveNetwork | Indicates interactive network characteristics. For example, interactive network indictor, type, access parameter, etc. Exists only if interactive network is available. |
| RelatedMaterial | Indicates reference information regarding handover-related materials. For example, IP platform, information provider, service identifier, signal frequency, cell information, etc. |
| Signaling over interactive network | If set to be "true", it means that signaling over interactive network is possible; if set to be "false", it means that signaling over interactive network is not possible. |
| Service delivery over interactive network handover | If set to be "true", it means that service data delivery over interactive network is possible; if set to be "false", it means that service data delivery over interactive network is not possible. |
| Network control availability | If set to be "true", it means that network control is possible; if set to be "false", it means that network control is not possible. |
| Network control is mandatory | If set to be "true", it means that network control is mandatory; if set to be "false", it means that network control is not mandatory. |

Descriptions of the fields "InteractiveNetwork", "Signaling over interactive network", and "Service delivery over interactive network" in Tables 8a, 8b, and 9 are the same as those of the previous case. The additional attribute value "Network control availability" means that network control is available when set to be "true", and that network control is not available when set to be "false". Another attribute value "Network control is mandatory" means that network control is mandatory when set to be "true", and that network control is not mandatory when set to be "false".

Figure 4A:
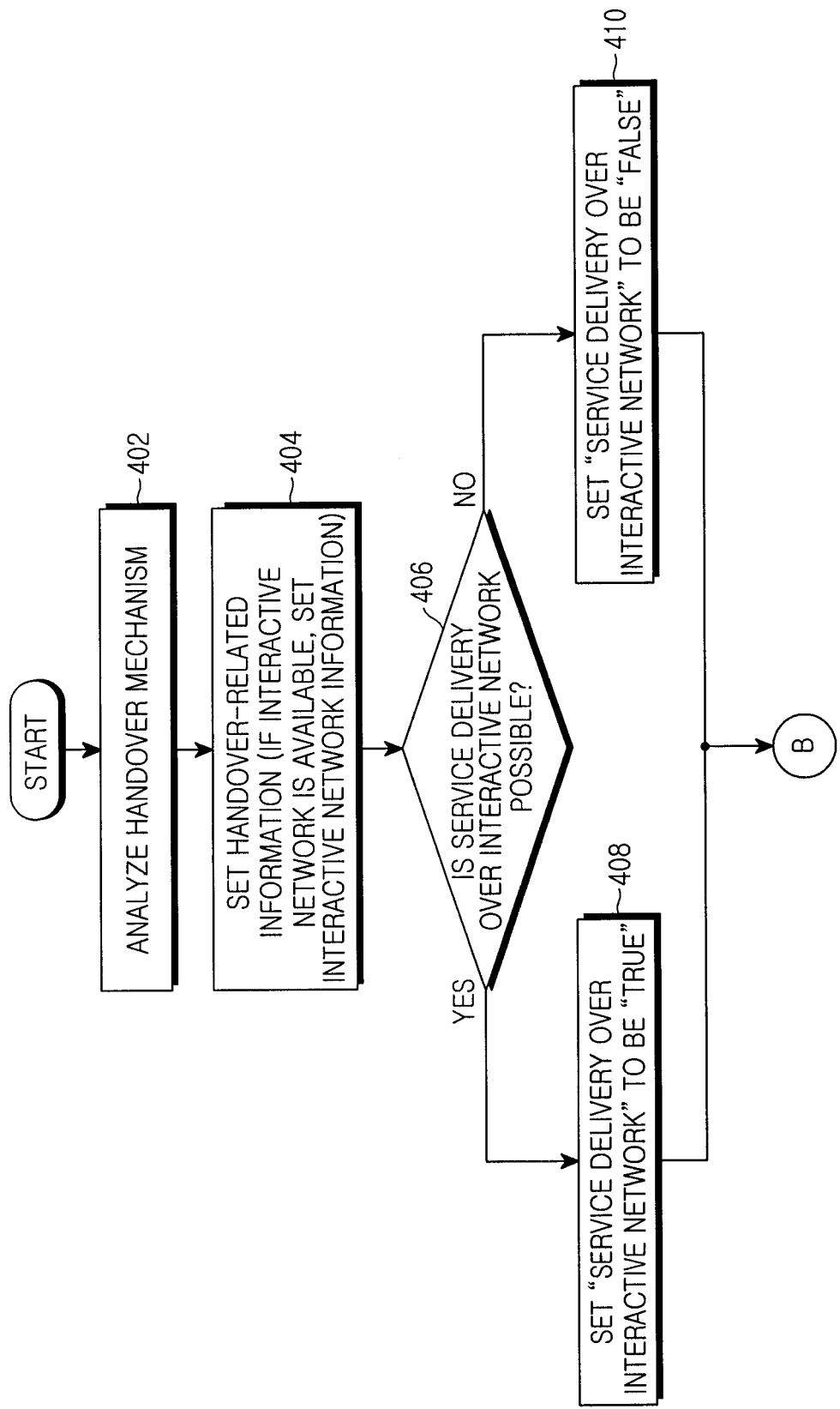
FIGS. 4a and 4b are flowcharts showing operations for transmitting mobility information according to an embodiment of the present invention.
Figure 4B:
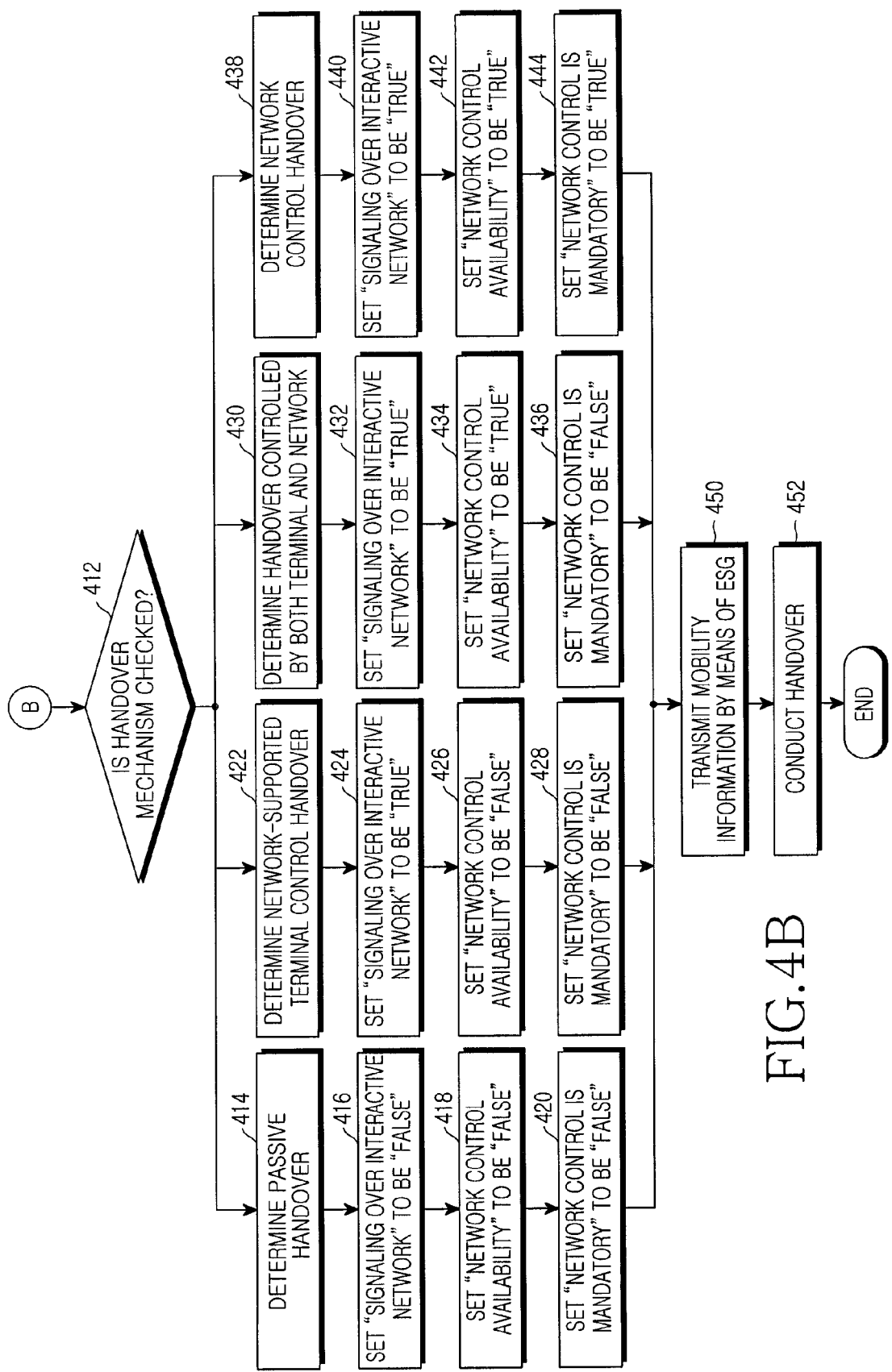
Figure 5:
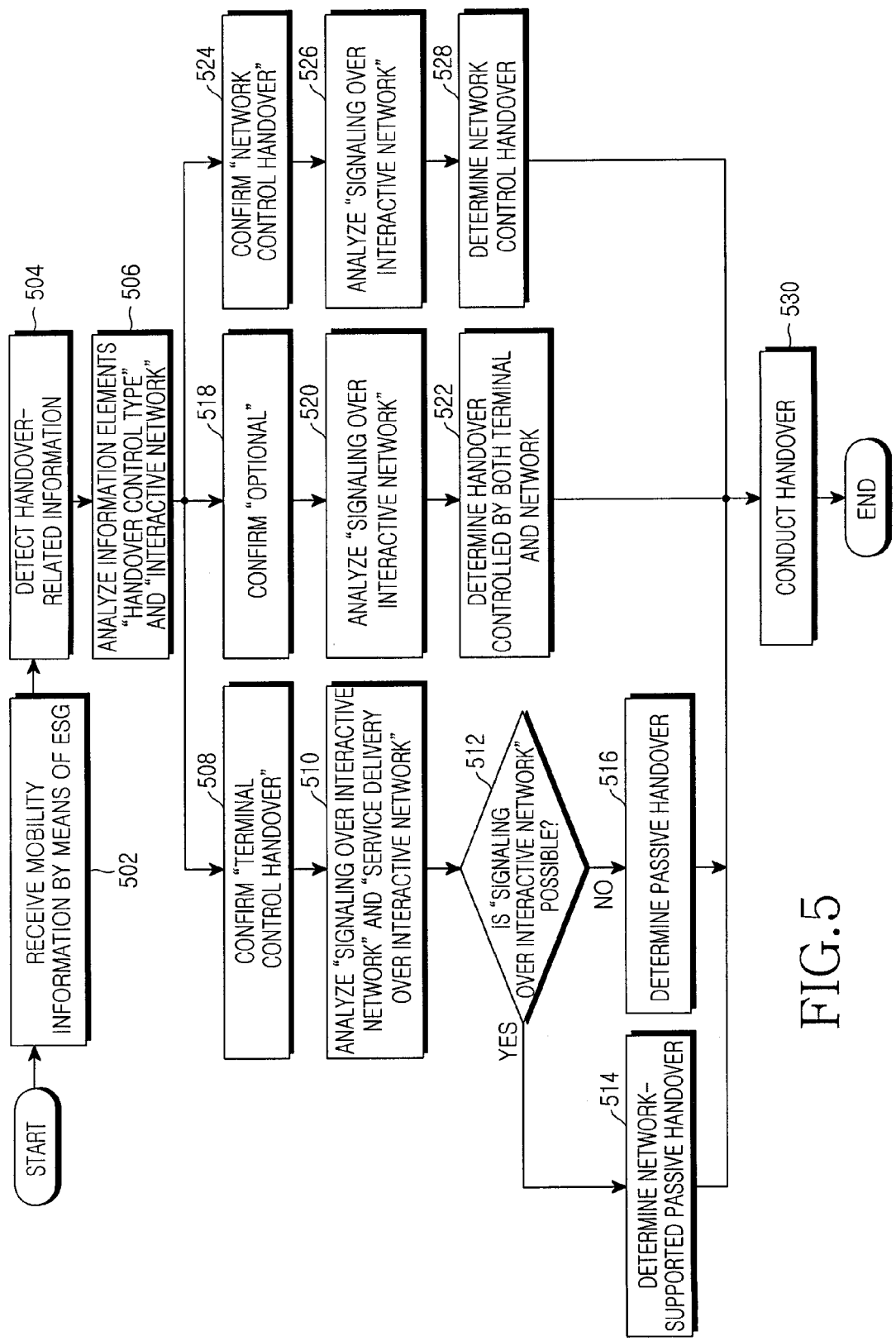
FIG. 5 is a flowchart showing operations for receiving mobility information according to an embodiment of the present invention.

FIGS. 4 and 5 are flowcharts showing operations of the network and the terminal according to a first embodiment of the present invention. As will be described below, the network-side operations are conducted by an entity that is in charge of handover control in the network, e.g. SA block 120, SM block 130, or other handover control entity.

Referring to FIG. 4 (split into FIG. 4a and FIG. 4b for convenience), the network entity analyzes available handover mechanisms to set related information elements based on different handover mechanisms, for example, based on consideration of the capacity of terminals, the agreement with the interactive network, etc., in step 402, and sets handover-related information in step 404. For example, if an interactive network is available, the handover-related information includes information regarding the interactive network. The network entity determines if service delivery over the interactive network is possible in step 406. If it is determined that service delivery over the interactive network is possible, the network entity sets the handover-related information element "service delivery over interactive network" to be "true" in step 408. If not, the network entity sets the "service delivery over interactive network" to be "false" in step 410.

The network entity checks at least one available handover mechanism in step 412 and proceeds to at least one of steps 414, 422, 430, and 438. If the network entity decides to set handover-related information regarding a passive handover mechanism in step 414, the "Signaling over interactive network" is set to be "false" in step 416, the "Network control availability" is set to be "false" in step 418, and the "Network control is mandatory" is set to be "false" in step 420.

If the network entity decides to set handover-related information regarding the mechanism of a network-supported terminal control handover in step 422, the "Signaling over interactive network" is set to be "true" in step 424, the "Network control availability" is set to be "false" in step 426, and the "Network control is mandatory" is set to be "false" in step 428.

If the network entity decides to set handover-related information regarding the mechanism of a handover controlled by both the terminal and the network in step 430, the "Signaling over interactive network" is set to be "true" in step 432, the "Network control availability" is set to be "true" in step 434, and the "Network control is mandatory" is set to be "false" in step 436.

If the network entity decides to set handover-related information regarding the mechanism of a network control handover in step 438, the "Signaling over interactive network" is set to be "true" in step 440, the "Network control availability" is set to be "true" in step 442, and the "Network control is mandatory" is set to be "true" in step 444.

After setting all information elements to be included in the handover-related information through steps 414-444, the network entity inserts the handover-related information, which includes the above-mentioned information elements, into mobility information, loads the mobility information onto at least one ESG stream, and transmits it to terminals in step 450. If a handover actually occurs, the network entity processes or manages the handover based on the handover-related information in step 452. In the case of a passive handover, the network entity has nothing to do with the handover procedure. In the case of a handover controlled by both the terminal and the network, the network entity takes proper measures according to whether it is a terminal control handover or a network control handover.

Referring to FIG. 5, the terminal receives mobility information by means of at least one ESG stream provided by the CBMS system in step 502. The terminal detects handover-related information included in the mobility information in step 504. The terminal analyzes the information elements "HandoverControlType" and "InteractiveNetwork", which are included in the handover-related information, based on a predetermined syntax of the handover-related information in step 506. Particularly, based on the handover type confirmed from the "HandoverControlType", the terminal determines if a terminal control handover is possible, if a network control handover is possible, or if both a terminal control handover and a network control handover are optional.

The terminal confirms that a terminal control handover is possible based on the "HandoverControlType" in step 508. The terminal analyzes the "Signaling over interactive network" and "Service delivery over interactive network", which are included in the handover-related information, in step 510. The terminal determines if signaling over the interactive network is possible based on the "Signaling over interactive network" in step 512. If signaling over the interactive network is not possible, the terminal decides to conduct a passive handover in step 516. If signaling over the interactive network is possible, the terminal decides to conduct a network-supported passive handover, i.e. a terminal control handover with network support, in step 514, and proceeds to step 530.

The terminal confirms that both a terminal control handover and a network control handover are optional based on the "HandoverControlType" in step 518. The terminal analyzes the "Signaling over interactive network" and "Service delivery over interactive network" in step 520. If the "Signaling over interactive network" has been set to be "true", the terminal decides to conduct a handover controlled by both the terminal and the network in step 522, and proceeds to step 530.

The terminal confirms that a network control handover is possible based on the "HandoverControlType" in step 524. The terminal analyzes the "Signaling over interactive network" and "Service delivery over interactive network" in step 526. If the "Signaling over interactive network" has been set to be "true", the terminal decides to conduct a network control handover in step 528, and proceeds to step 530.

In step 530, the terminal conducts a handover, if necessary, according to the handover mechanism, which has been confirmed to be available through steps 508-528. If the "Service delivery over interactive network" has been set to be "true", service data can be received over the interactive network after the handover is conducted. When the terminal decides a handover in step 530, the terminal either decides a handover by itself or receives a handover instruction from the network according to whether the handover is controlled by the terminal or by the network. The handover decision is basically made by the terminal or by the network according to the intensity of signals received from the home network as measured by the terminal and/or the intensity of signals received from the visited network.

Figure 6A:
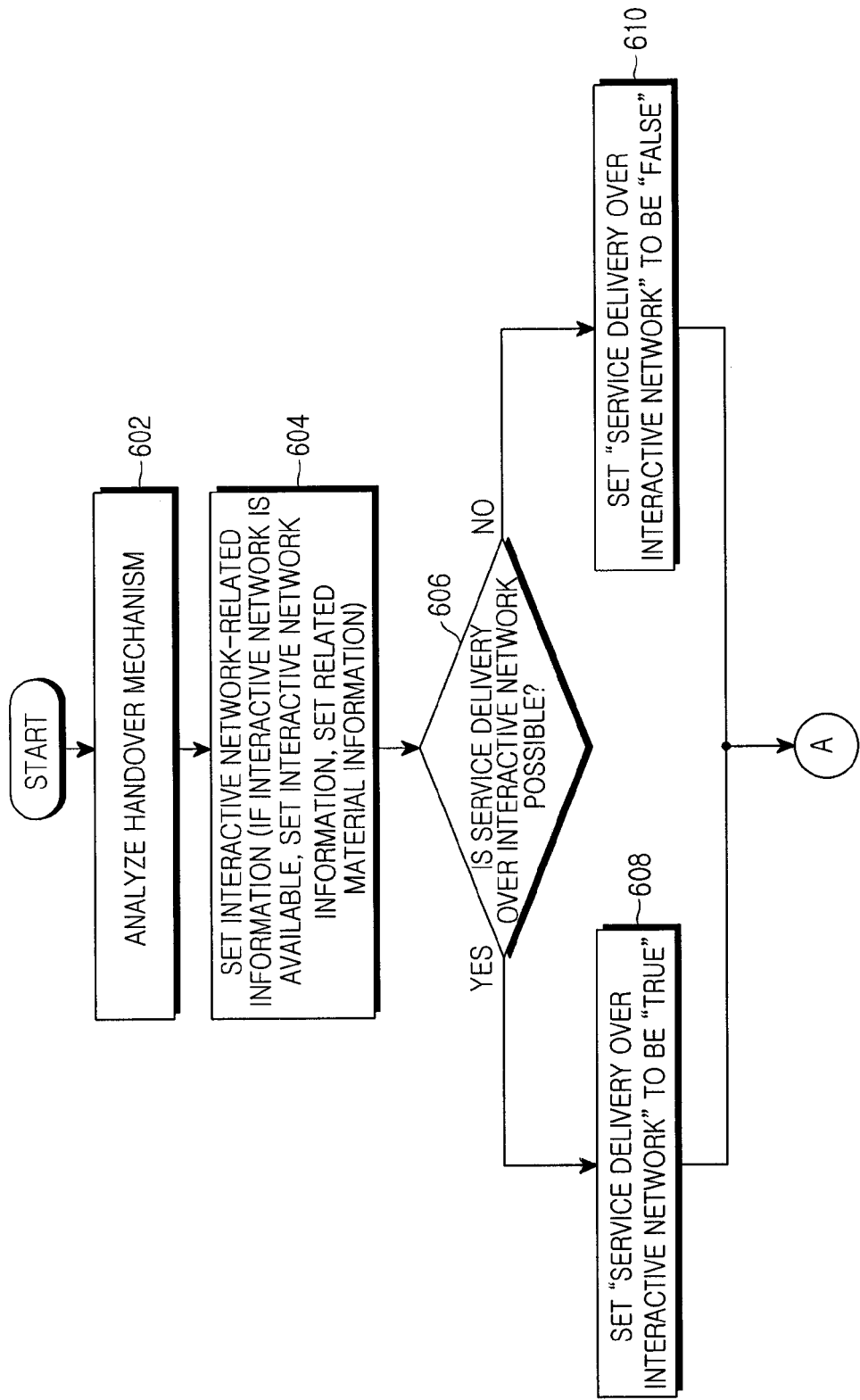
FIGS. 6a and 6b are flowcharts showing operations for transmitting mobility information according to another embodiment of the present invention.
Figure 6B:
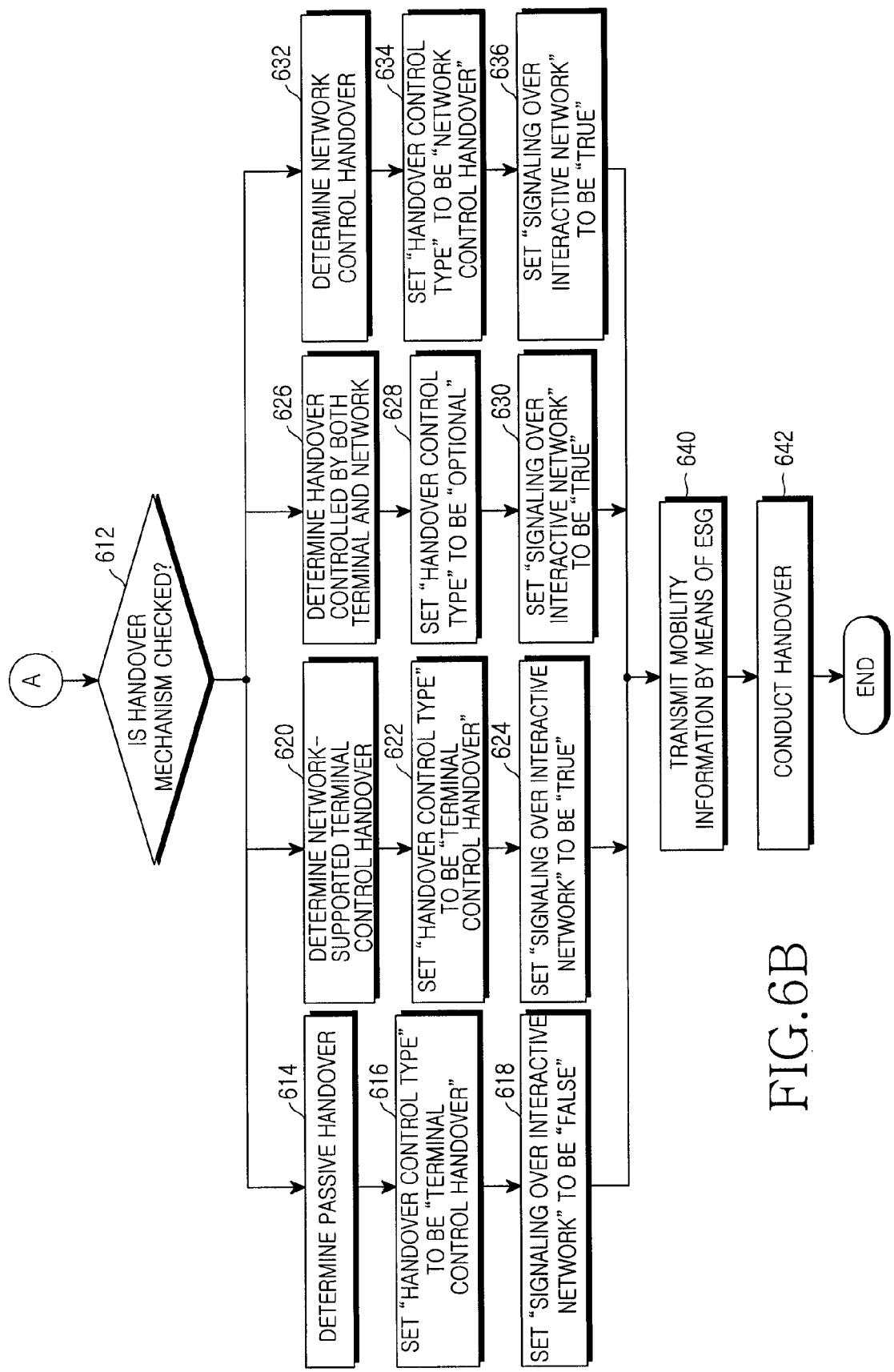
Figure 7:
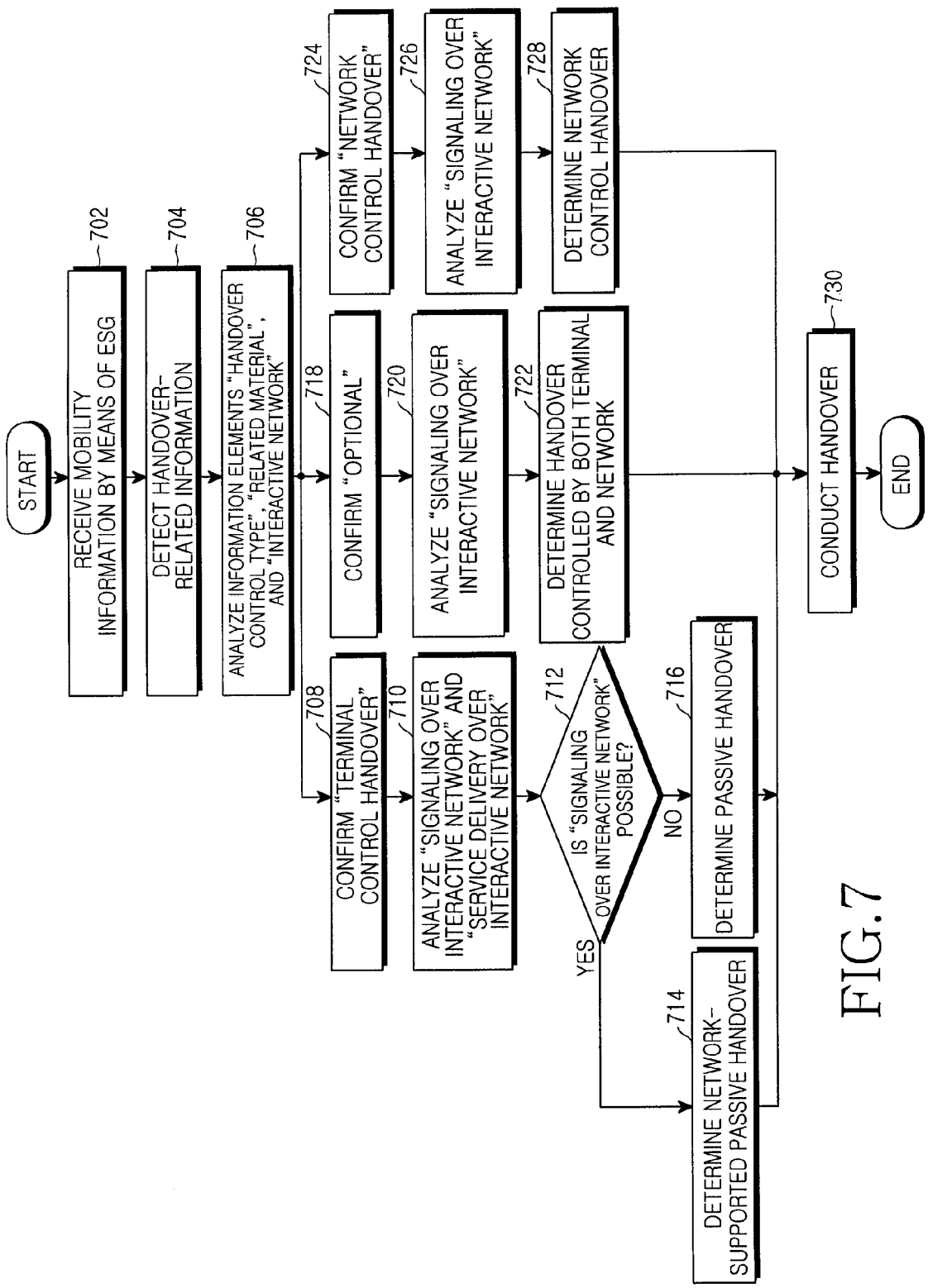
FIG. 7 is a flowchart showing operations for receiving mobility information according to another embodiment of the present invention.

FIGS. 6 and 7 are flowcharts showing operations of the network and the terminal according to another embodiment of the present invention.

Referring to FIG. 6 (split into FIG. 6a and FIG. 6b for convenience), the network entity analyzes available handover mechanisms to set related information elements based on different handover mechanisms in step 602, and sets interactive network-related information, which is to be included in the handover-related information, in step 604. In other words, if an interactive network is available, the handover-related information includes information regarding the interactive network, and related material information is set within the handover-related information. The network entity determines if service delivery over the interactive network is available in step 606. If service delivery over the interactive network is possible, the handover-related information element "Service delivery over interactive network" is set to be "true" in step 608. If service delivery over the interactive network is not possible, the "Service delivery over interactive network" is set to be "false" in step 610.

The network entity checks at least one available handover mechanism in step 612 and proceeds to one of steps 614, 620, 626, and 632. If the network entity decides to set handover-related information regarding a passive handover mechanism in step 614, the "HandoverControlType" is set to be "terminal control handover" in step 616, and the "Signaling over interactive network" is set to be "false" in step 618.

If the network entity decides to set handover-related information regarding the mechanism of a network-supported handover controlled by the terminal in step 620, the "HandoverControlType" is set to be "terminal control handover" in step 622, and the "Signaling over interactive network" is set to be "true" in step 624.

If the network entity decides to set handover-related information regarding the mechanism of a handover controlled by both the terminal and the network in step 626, the "HandoverControlType" is set to be "optional", which means that both a terminal control handover and a network control handover are optional, in step 628, and the "Signaling over interactive network" is set to be "true" in step 630.

If the network entity decides to set handover-related information regarding the mechanism of a network control handover in step 632, the "HandoverControlType" is set to be "network control handover" in step 634, and the "Signaling over interactive network" is set to be "true" in step 636.

After setting all information elements to be included in the handover-related information through steps 614-636, the network entity inserts the handover-related information, which includes the above-mentioned information elements, into mobility information, loads the mobility information onto at least one ESG stream, and transmits it to terminals in step 640. If a handover actually occurs, the network entity processes or manages the handover based on the handover-related information in step 642. In the case of a passive handover, the network entity has nothing to do with the handover procedure. In the case of a handover controlled by both the terminal and the network, the network entity takes proper measures according to whether it is a terminal control handover or a network control handover.

Referring to FIG. 7, the terminal receives mobility information by means of at least one ESG stream provided by the CBMS system in step 702. The terminal detects handover-related information included in the mobility information in step 704. The terminal analyzes the information elements "HandoverControlType", "RelatedMaterial", and "InteractiveNetwork", which are included in the handover-related information, based on a predetermined syntax of the handover-related information in step 706. Particularly, based on the handover type confirmed from the "HandoverControlType", the terminal determines if a terminal control handover is possible, if a network control handover is possible, or if both a terminal control handover and a network control handover are optional.

The terminal confirms that a terminal control handover is possible based on the "HandoverControlType" in step 708. The terminal analyzes the "Signaling over interactive network" and "Service delivery over interactive network", which are included in the handover-related information, in step 710. The terminal determines if signaling over the interactive network is possible based on the "Signaling over interactive network" in step 712. If signaling over the interactive network is not possible, the terminal decides to conduct a passive handover in step 716. If signaling over the interactive network is possible, the terminal decides to conduct a network-supported passive handover, i.e. a terminal control handover with network support, in step 714, and proceeds to step 730.

The terminal confirms that both a terminal control handover and a network control handover are optional based on the "HandoverControlType" in step 718. The terminal analyzes the "Signaling over interactive network" and "Service delivery over interactive network" in step 720. If the "Signaling over interactive network" has been set to be "true", the terminal decides to conduct a handover controlled by both the terminal and the network in step 722, and proceeds to step 730.

The terminal confirms that a network control handover is possible based on the "HandoverControlType" in step 724. The terminal analyzes the "Signaling over interactive network" and "Service delivery over interactive network" in step 726. If the "Signaling over interactive network" has been set to be "true", the terminal decides to conduct a network control handover in step 728, and proceeds to step 730.

In step 730, the terminal conducts a handover, if necessary, according to the decision made through steps 708-728. If the "Service delivery over interactive network" has been set to be "true", service data can be received over the interactive network after the handover is conducted. If necessary, the terminal acquires additional handover-related information from a server, which has been accessed based on the "RelatedMaterial" information, and uses the information to conduct the handover. When the terminal decides a handover in step 730, the terminal either decides a handover by itself or receives a handover instruction from the network according to whether the handover is controlled by the terminal or by the network. The handover decision is basically made by the terminal or by the network according to the intensity of signals received from the home network as measured by the terminal and/or the intensity of signals received from the visited network.

Figure 8A:
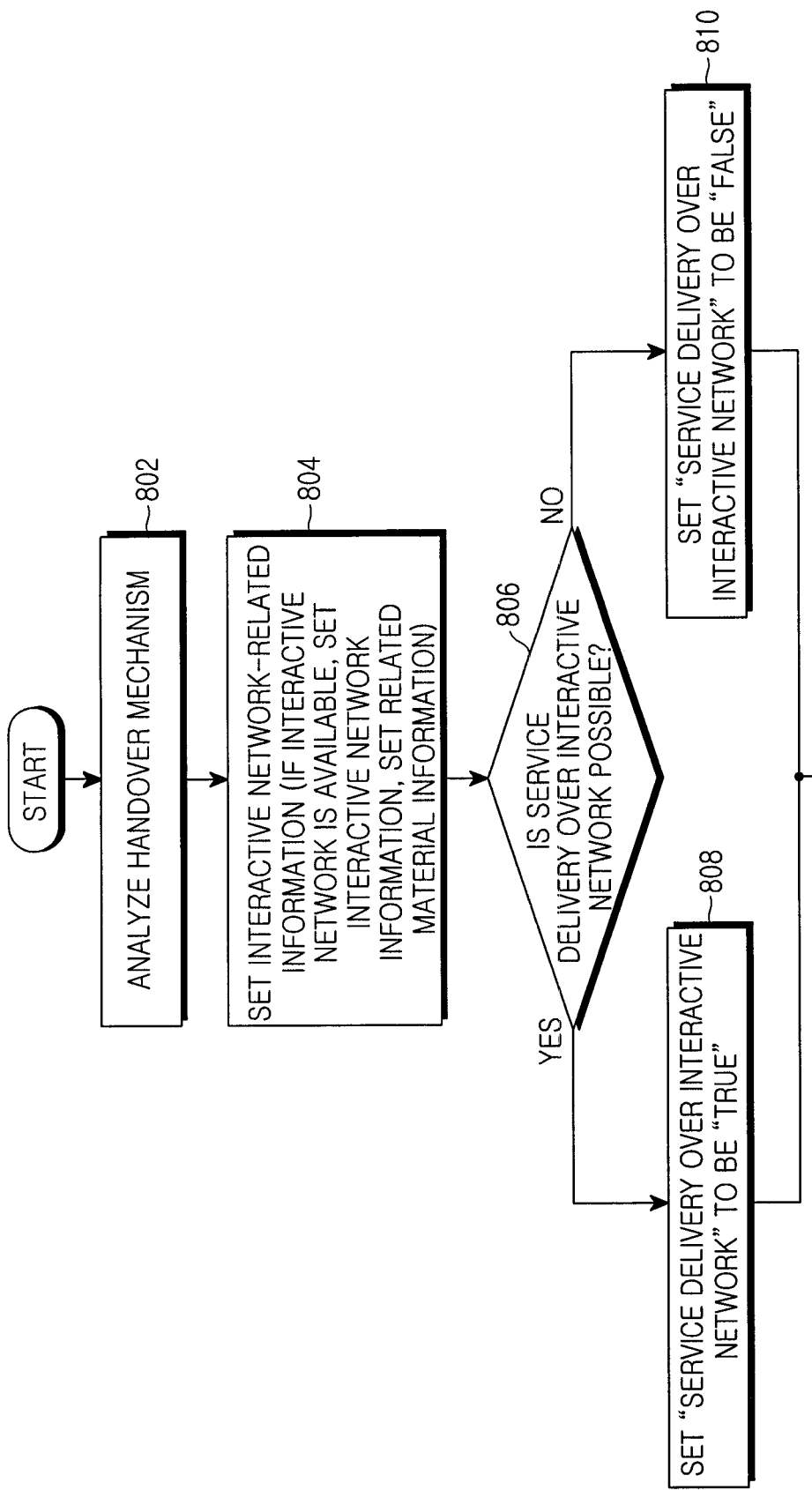
FIGS. 8a and 8b are flowcharts showing operations for transmitting mobility information according to a still another embodiment of the present invention.
Figure 8B:
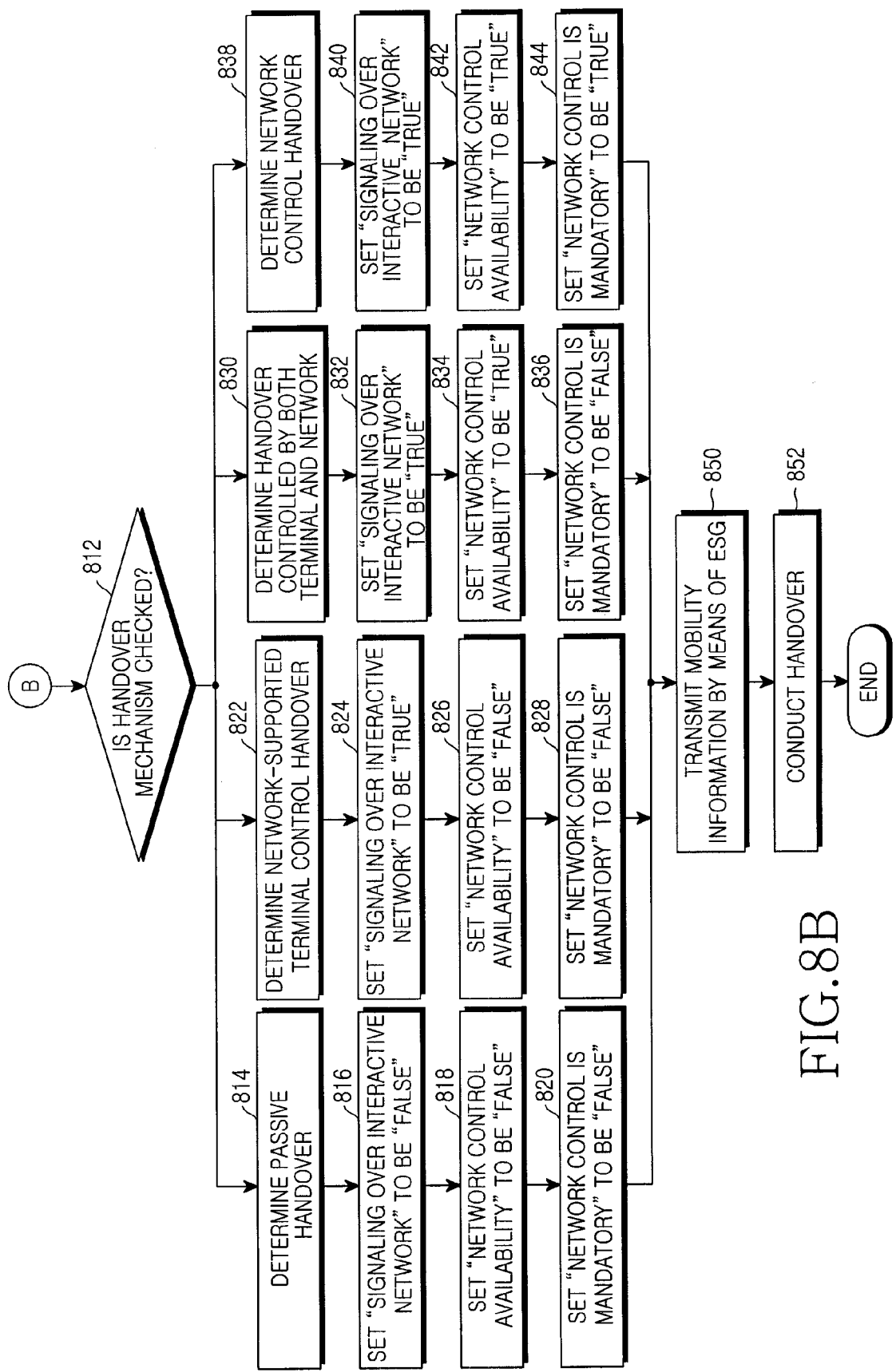
Figure 9:
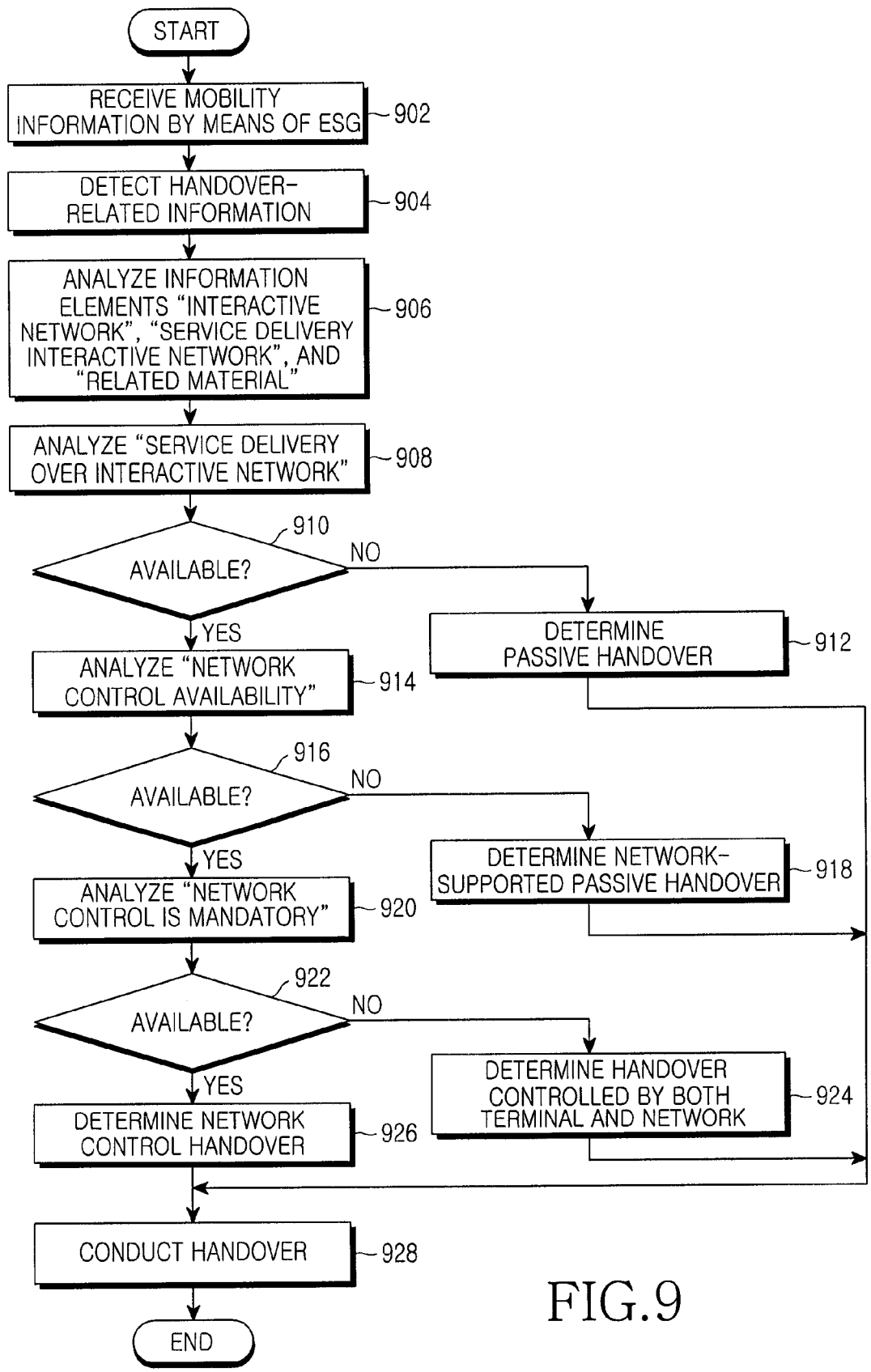
FIG. 9 is a flowchart showing operations for receiving mobility information according to a still another embodiment of the present invention.

FIGS. 8 and 9 are flowcharts showing operations of the network and the terminal according to another embodiment of the present invention.

Referring to FIG. 8 (split into FIG. 8a and FIG. 8b for convenience), the network entity analyzes available handover mechanisms to set related information elements based on different handover mechanisms in step 802, and sets interactive network-related information, which is to be included in the handover-related information, in step 804. In other words, if an interactive network is available, the handover-related information includes information regarding the interactive network, and related material information is set within the handover-related information. The network entity determines if service delivery over the interactive network is available in step 806. If service delivery over the interactive network is possible, the handover-related information element "Service delivery over interactive network" is set to be "true" in step 808. If service delivery over the interactive network is not possible, the "Service delivery over interactive network" is set to be "false" in step 810.

The network entity checks at least one available handover mechanism in step 812 and proceeds to one of steps 814, 822, 830, and 838. If the network entity decides to set handover-related information regarding a passive handover mechanism in step 814, the "Signaling over interactive network" is set to be "false" in step 816, the "Network control availability" is set to be "false" in step 818, and the "Network control is mandatory" is set to be "false" in step 820.

If the network entity decides to set handover-related information regarding the mechanism of a network-supported terminal control handover in step 822, the "Signaling over interactive network" is set to be "true" in step 824, the "Network control availability" is set to be "false" in step 826, and the "Network control is mandatory" is set to be "false" in step 828.

If the network entity decides to set handover-related information regarding the mechanism of a handover controlled by both the terminal and the network in step 830, the "Signaling over interactive network" is set to be "true" in step 832, the "Network control availability" is set to be "true" in step 834, and the "Network control is mandatory" is set to be "false" in step 836.

If the network entity decides to set handover-related information regarding the mechanism of a network control handover in step 838, the "Signaling over interactive network" is set to be "true" in step 840, the "Network control availability" is set to be "true" in step 842, and the "Network control is mandatory" is set to be "true" in step 844.

After setting all information elements to be included in the handover-related information through steps 814-844, the network entity inserts the handover-related information, which includes the above-mentioned information elements, into mobility information, loads the mobility information onto at least one ESG stream, and transmits it to terminals in step 850. If a handover actually occurs, the network entity processes or manages the handover based on the handover-related information in step 852. In the case of a passive handover, the network entity has nothing to do with the handover procedure. In the case of a handover controlled by both the terminal and the network, the network entity takes proper measures according to whether it is a terminal control handover or a network control handover.

Referring to FIG. 9, the terminal receives mobility information by means of at least one ESG stream provided by the CBMS system in step 902. The terminal detects handover-related information included in the mobility information in step 904. The terminal analyzes the information elements "InteractiveNetwork", "Service delivery over interactive network", and "RelatedMaterial", which are included in the handover-related information, based on a predetermined syntax of the handover-related information in step 906.

The terminal analyzes the "Signaling over interactive network" in step 908. If it is confirmed in step 910 that signaling over the interactive network is not possible, the terminal determines that a passive handover can be conducted in step 912, and proceeds to step 928. If it is confirmed that signaling over the interactive network is possible, the terminal proceeds to step 914 and analyzes the "Network control availability" included in the handover-related information. If it is confirmed in step 916 that network control is not available, the terminal determines that a network-supported passive handover can be conducted in step 918, and proceeds to step 928. If it is confirmed that network control is available, the terminal proceeds to step 920.

The terminal analyzes the "Network control is mandatory" included in the handover-related information in step 920. If it is confirmed in step 922 that network control is not mandatory, the terminal determines that a handover controlled by both the terminal and the network can be conducted in step 924, and proceeds to step 924. If it is confirmed that network control is mandatory, the terminal determines in step 926 that a network control handover can be conducted, and proceeds to step 928.

In step 928, the terminal conducts a handover, if necessary, according to the determined handover mechanism. If the "Service delivery over interactive network" has been set to be "true", service data can be received over the interactive network after the handover is conducted. If necessary, the terminal acquires additional handover-related information from a server, which has been accessed based on the "RelatedMaterial" information, and uses the information to conduct the handover. When the terminal decides a handover in step 928, the terminal either decides a handover by itself or receives a handover instruction from the network according to whether the handover is controlled by the terminal or by the network. The handover decision is basically made by the terminal or by the network according to the intensity of signals received from the home network as measured by the terminal and/or the intensity of signals received from the visited network.

Those skilled in the art can easily understand that, besides the above-mentioned formats of mobility information, other types of formats can also be used, as shown in the following Tables 10 and 11.

TABLE 10

```
<?xml version="1.0" encoding="UTF-8"?>
<schema     xmlns:xs="http://www.w3.org/2001/XMLSchema"     elementFormDefault="qualified"
attributeFormDefault="unqualified">
 <ClassificationScheme uri="urn:dvb:ipdc:esg:cs:MobilityCS">
   <Term termID="1">
    <Name xml:lang="en">HandoverCotrolType</Name>
    <Definition xml:lang="en">Type of handover control, e.g. terminal control handover is mandatory,
both terminal and network control handover are optional, network control handover is mandatory
    </Definition>
   <Term termID="1.1">
    <Name xml:lang="en"> terminal control</Name>
    <Definition xml:lang="en">A terminal control handover </Definition>
   </Term>
    <Term termID="1.2">
    <Name xml:lang="en"> both terminal and network control are optional </Name>
    <Definition xml:lang="en"> both terminal and network control handover are optional </Definition>
   </Term>
   <Term termID="1.3">
    <Name xml:lang="en"> network control</Name>
    <Definition xml:lang="en">A network control handover </Definition>
   </Term>
  </Term>
  <Term termID="2">
```

TABLE 10-continued

```
<Name xml:lang="en">HandoverType</Name>
<Definition xml:lang="en">HandoverType</Definition>
  <Term termID="2.1">
    <Name xml:lang="en">Passive handover</Name>
    <Definition xml:lang="en">1. terminal control</Definition>
  </Term>
  <Term termID="2.2">
    <Name xml:lang="en">
    Terminal control Active handover with assistant signaling
    </Name>
    <Definition xml:lang="en">
    1. terminal control
    2. Interactive network is available.
    3. the terminal could get handover assistant from network side over interactive network
    4. interactive network type
    </Definition>
  </Term>
  <Term termID="2.3">
    <Name xml:lang="en">
    Terminal control active handover with service delivery over interactive network
    </Name>
    <Definition xml:lang="en">
    1. terminal control
    2. Interactive network is available.
    3. the terminal could receive service over interactive network
    4. interactive network type
    </Definition>
  </Term>
  <Term termID="2.4">
    <Name xml:lang="en">
    Terminal control active handover with assistant signaling and service delivery over interactive
network
    </Name>
    <Definition xml:lang="en">
    1. terminal control
    2. Interactive network is available.
    3. the terminal could get handover assistant from network side over interactive network
    4. the terminal could receive service over interactive network
    5. interactive network type
    </Definition>
  </Term>
  <Term termID="2.5">
    <Name xml:lang="en">
    Network control handover
    </Name>
    <Definition xml:lang="en">
    1. network control
    2. Interactive network is available.
    3. the network could assistant the terminal for handover over interactive network
    4. interactive network type
    </Definition>
  </Term>
  <Term termID="2.6">
    <Name xml:lang="en">
    Network control with service delivery over interactive network handover
    </Name>
    <Definition xml:lang="en">
    1. network control
    2. Interactive network is available.
    3. the network could assistant the terminal for handover over interactive network
    4. the service could delivered to the terminal over interactive network.
    5. interactive network type
    </Definition>
  </Term>
  <Term termID="2.7">
    <Name xml:lang="en">
    Both terminal control and network control handover are optional
    </Name>
    <Definition xml:lang="en">
    1. both terminal and network control are optional.
    2. Interactive network is available.
    3. the network could assistant the terminal for handover over interactive network
    4. interactive network type
    </Definition>
  </Term>
  <Term termID="2.8">
    <Name xml:lang="en">
    Both terminal control and network control are optional with service delivery over interactive network
handover
    </Name>
```

TABLE 10-continued

```xml
    <Definition xml:lang="en">
    1. both terminal and network control are optional.
    2. Interactive network is available.
    3. the network could assistant the terminal for handover over interactive network
    4. the service could delivered to the terminal over interactive network
    5. interactive network type
    </Definition>
  </Term>
</Term>
<Term termID="3">
<Name xml:lang="en">RoamingType</Name>
<Definition xml:lang="en">RoamingType</Definition>
  <Term termID="2.1">
    <Name xml:lang="en">Passive roaming</Name>
    <Definition xml:lang="en">1. terminal control</Definition>
  </Term>
  <Term termID="2.2">
    <Name xml:lang="en">
    Terminal control Active roaming with assistant signaling
    </Name>
    <Definition xml:lang="en">
    1. terminal control
    2. Interactive network is available.
    3. the terminal could get handover assistant from network side over interactive network
    4. interactive network type
    </Definition>
  </Term>
  <Term termID="2.3">
    <Name xml:lang="en">
    Terminal control active roaming with service delivery over interactive network
    </Name>
    <Definition xml:lang="en">
    1. terminal control
    2. Interactive network is available.
    3. the terminal could receive service over interactive network
    4. interactive network type
    </Definition>
  </Term>
  <Term termID="2.4">
    <Name xml:lang="en">
    Terminal control active handover with assistant signaling and service delivery over interactive
network
    </Name>
    <Definition xml:lang="en">
    1. terminal control
    2. Interactive network is available.
    3. the terminal could get roaming assistant from network side over interactive network
    4. the terminal could receive service over interactive network
    5.    interactive network type
    </Definition>
  </Term>
  <Term termID="2.5">
    <Name xml:lang="en">
    Network control roaming
    </Name>
    <Definition xml:lang="en">
    1. network control
    2. Interactive network is available.
    3. the network could assistant the terminal for roaming over interactive network
    4. interactive network type
    </Definition>
  </Term>
  <Term termID="2.6">
    <Name xml:lang="en">
    Network control with service delivery over interactive network roaming
    </Name>
    <Definition xml:lang="en">
    1. network control
    2. Interactive network is available.
    3. the network could assistant the terminal for roaming over interactive network
    4. the service could delivered to the terminal over interactive network.
    5. interactive network type
    </Definition>
  </Term>
  <Term termID="2.7">
    <Name xml:lang="en">
    Both terminal control and network control roaming are optional
    </Name>
```

TABLE 10-continued

```
    <Definition xml:lang="en">
    1. both terminal and network control are optional.
    2. Interactive network is available.
    3. the network could assistant the terminal for roaming over interactive network
    4. interactive network type
    </Definition>
   </Term>
   <Term termID="2.8">
    <Name xml:lang="en">
   Both terminal control and network control are optional with service delivery over interactive network
roaming
    </Name>
    <Definition xml:lang="en">
    1. both terminal and network control are optional.
    2. Interactive network is available.
    3. the network could assistant the terminal for roaming over interactive network
    4. the service could delivered to the terminal over interactive network
    5. interactive network type
    </Definition>
   </Term>
  </Term>
 </ClassificationScheme>
</schema>
```

TABLE 11

```
<?xml version="1.0" encoding="UTF-8"?>
<schema   xmlns:xs="http://www.w3.org/2001/XMLSchema"   elementFormDefault="qualified"
attributeFormDefault="unqualified">
 <element name="HandoverType">
  <complexType>
   <choice>
    <element name="PassiveHandover" minOccurs="0">
     <complexType>
      <attribute       name="       type" type="tva:ControlledTermType"
fixed="urn:dvb:ipdc:esg:cs:MobilityCS:2.1"/>
      <attribute name="HandoverControlType" type="HandoverCotrolType" fixed="terminal
control"/>
     </ complexType>
    </ element>
    <element name="TerminalControlActiveHandover WithAssistantSignaling" minOccurs="0">
     <complexType>
      <attribute       name="type"       type="tva:ControlledTermType"
fixed="urn:dvb:ipdc:esg:cs:MobilityCS:2.2"/>
      <attribute name="HandoverControlType" type="HandoverCotrolType" fixed="terminal
control"/>
      <attribute name="InterativeNetwork" type=" boolean" fixed="true"/>
      <attribute name="SignalingOverInteractiveNetwork" type=" boolean" use="optional"
fixed="true"/>
      <attribute name="InteractiveNetworkType" type="InteractiveNetworkType"/>
     </ complexType>
    </ element>
    <element name="TerminalControlActiveHandoverWithServiceDilivery OverInteractiveNetwork"
minOccurs="0">
     <complexType>
      <attribute       name="type"       type="tva:ControlledTermType"
fixed="urn:dvb:ipdc:esg:cs:MobilityCS:2.3"/>
      <attribute name="HandoverControlType" type="HandoverCotrolType" fixed="terminal
control"/>
      <attribute name="InterativeNetwork" type=" boolean" fixed="true"/>
      <attribute name="ServiceDeliveryOverInteractiveNetwork Handover" type=" boolean"
use="optional" fixed="true"/>
      <attribute name="InteractiveNetworkType" type="InteractiveNetworkType"/>
     </ complexType>
    </ element>
    <element            name="TerminalCotrolActiveHandoverWithAssistant
SignalingAndServiceDeliveryOverInteractiveNetwork" minOccurs="0">
     <complexType>
      <attribute       name="type"       type="tva:ControlledTermType"
fixed="urn:dvb:ipdc:esg:cs:MobilityCS:2.4"/>
      <attribute name="HandoverControlType" type="HandoverCotrolType" fixed="terminal
control"/>
      <attribute name="InterativeNetwork" type=" boolean" fixed="true"/>
      <attribute name="SignalingOverInteractiveNetwork" type=" boolean" use="optional"
fixed="true"/>
      <attribute name="ServiceDeliveryOverInteractiveNetwork Handover" type=" boolean"
use="optional" fixed="true"/>
```

TABLE 11-continued

```
        <attribute name="InteractiveNetworkType"type= "InteractiveNetworkType"/>
      </ complexType>
    </ element>
    <element name="NetworkCotrolHandover" minOccurs="0">
      <complexType>
        <attribute         name="type"         type="tva:ControlledTermType"
fixed="urn:dvb:ipdc:esg:cs:MobilityCS:2.5"/>
        <attribute name="HandoverControlType" type="HandoverCotrolType" fixed="network control"/>
        <attribute name="InterativeNetwork" type=" boolean" fixed="true"/>
        <attribute  name="SignalingOverInteractiveNetwork"  type="  boolean"  use="optional"
fixed="true"/>
        <attribute name="InteractiveNetworkType" type="InteractiveNetworkType"/>
      </ complexType>
    </ element>
    <element  name="NetworkCotrol  WithServiceDeliveryOver  InteractiveNetworkHandover"
minOccurs="0">
      <complexType>
        <attribute         name="type"         type="tva:ControlledTermType"
fixed="urn:dvb:ipdc:esg:cs:MobilityCS:2.6"/>
        <attribute name="HandoverControlType" type="HandoverCotrolType" fixed="network control"/>
        <attribute name="InterativeNetwork" type=" boolean" fixed="true"/>
        <attribute  name="SignalingOverInteractiveNetwork"  type="  boolean"  use="optional"
fixed="true"/>
        <attribute   name="ServiceDeliveryOverInteractiveNetworkHandover"   type="   boolean"
use="optional" fixed="true"/>
        <attribute name="InteractiveNetworkType" type="InteractiveNetworkType"/>
      </ complexType>
    </ element>
    <element       name="BothTerminalControlAndNetworkControl       HandoverAreOptional"
minOccurs="0">
      <complexType>
        <attribute         name="type"         type="tva:ControlledTermType"
fixed="urn:dvb:ipdc:esg:cs:MobilityCS:2.7"/>
        <attribute name="HandoverControlType" type="HandoverCotrolType" fixed="both terminal and
network control are optional"/>
        <attribute name="InterativeNetwork" type=" boolean" fixed="true"/>
        <attribute  name="SignalingOverInteractiveNetwork"  type="  boolean"  use="optional"
fixed="true"/>
        <attribute name="InteractiveNetworkType" type="InteractiveNetworkType"/>
      </ complexType>
    </ element>
    <element               name="BothTerminalControlAndNetworkControlAreOptional
WithServiceDeliveryOverInteractiveNetworkHandover" minOccurs="0">
      <complexType>
        <attribute         name="type"         type="tva:ControlledTermType"
fixed="urn:dvb:ipdc:esg:cs:MobilityCS:2.8"/>
        <attribute name="HandoverControlType" type="HandoverCotrolType" fixed="both terminal and
network control are optional"/>
        <attribute name="InterativeNetwork" type=" boolean" fixed="true"/>
        <attribute  name="SignalingOverInteractiveNetwork"  type="  boolean"  use="optional"
fixed="true"/>
        <attribute  name="ServiceDeliveryOverInteractiveNetworkHandover"  type="  boolean"
use="optional" fixed="true"/>
        <attribute name="InteractiveNetworkType" type="InteractiveNetworkType"/>
      </ complexType>
    </ element>
   </ choice>
  </ complexType>
 </ element>
 < simpleType name="HandoverCotrolType">
  <restriction base=" string">
    <enumeration value="terminal control"/>
    <enumeration value="both terminal and network control are optional"/>
    <enumeration value="network control"/>
  </ restriction>
 </ simpleType>
 <simpleType name="InteractiveNetworkType">
  <restriction base=" string">
    <enumeration value="3GPP"/>
    <enumeration value="3GPP2"/>
    <enumeration value="WLAN"/>
    <enumeration value="WIBRO"/>
  </ restriction>
 </ simpleType>
</ schema>
```

The position of mobility information in the basic data model of the ESG, as shown in FIG. 2, is variously determined as in the following descriptions.

1. ESG Fragment

When an ESG is used to deliver mobility information, the mobility information is added as a new information element to at least one of the service fragment 202, the content fragment 206, and the acquisition fragment 208, which have been described with reference to FIG. 2. Alternatively, the mobility information is added as a new fragment (e.g. handover fragment) within the ESG.

2. ESG Announcement Carousel Session

In order to receive an ESG, the terminal identifies the IP address of the ESG bootstrap FLUTE (File Delivery over Unidirectional Transport protocol) session from the PSI/SI (Program Specific Information/Service Information), which is a control channel signal of the broadcasting system. The bootstrap session plays the role of providing basic information regarding the ESG, i.e. information regarding the ESG provider, the ESG list provided by the corresponding ESG provider, etc. These pieces of information are transmitted from an ESG provider discovery descriptor and an ESG access descriptor, respectively. Particularly, the ESG access descriptor informs of the IP address of the announcement carousel FLUTE session of each ESG. Each ESG has its own announcement carousel session, which plays the role of transmitting the ESG and providing brief information regarding the structure.

Figure 10A:
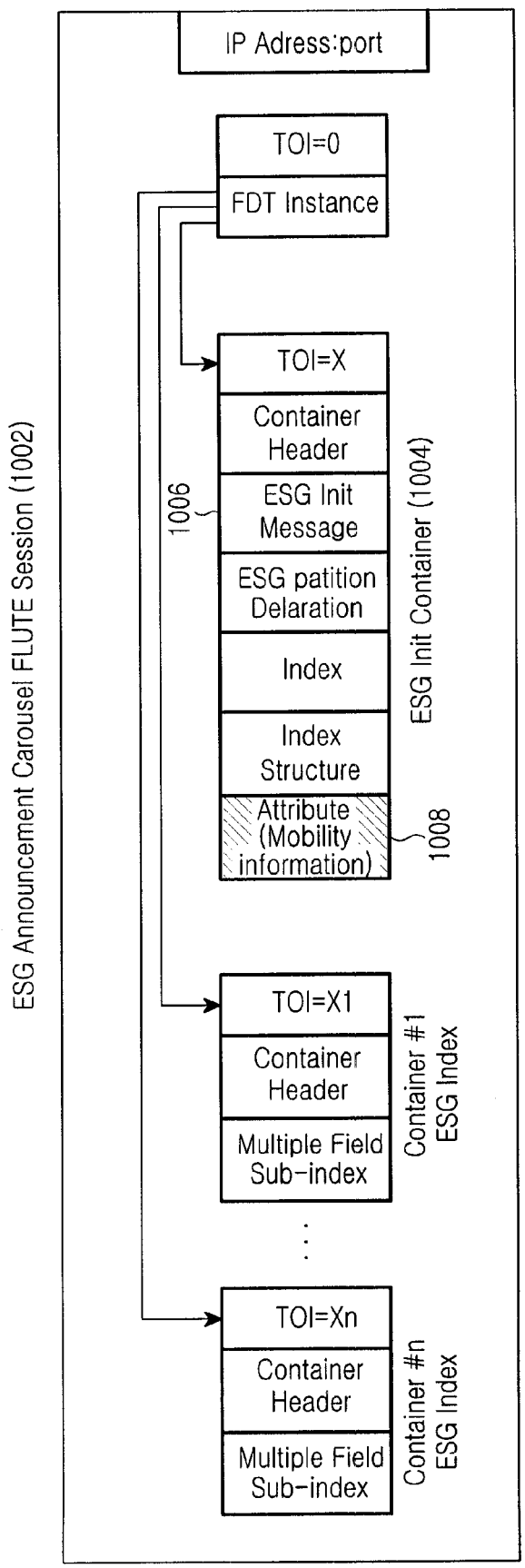
FIGS. 10a and 10b show examples of using an announcement carousel session to deliver mobility information according to an exemplary embodiment of the present invention.
Figure 10B:
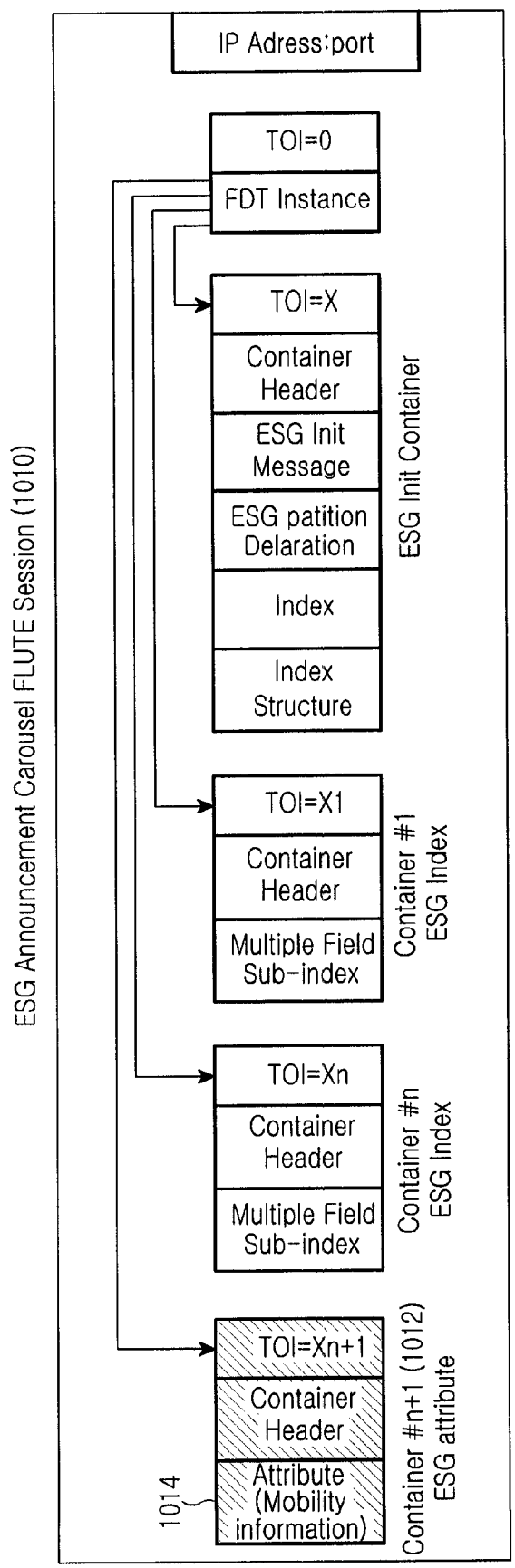

FIGS. 10 and 10b show examples of using an announcement carousel session to transfer mobility information. Referring to FIG. 10a, the announcement carousel session 1002 carries an ESG initialization container 1004 and a number of ESG index containers. The ESG initialization container 1004 includes an initialization message 1006 containing the compression mode of following ESG containers and related parameters, and mobility information 1008 having a format as described above. Referring to FIG. 10b, the mobility information 1014 is delivered by means of an independent ESG attribute container 1012, which is carried by the announcement carousel session 1010.

3. ESG Bootstrap

Figure 11A:
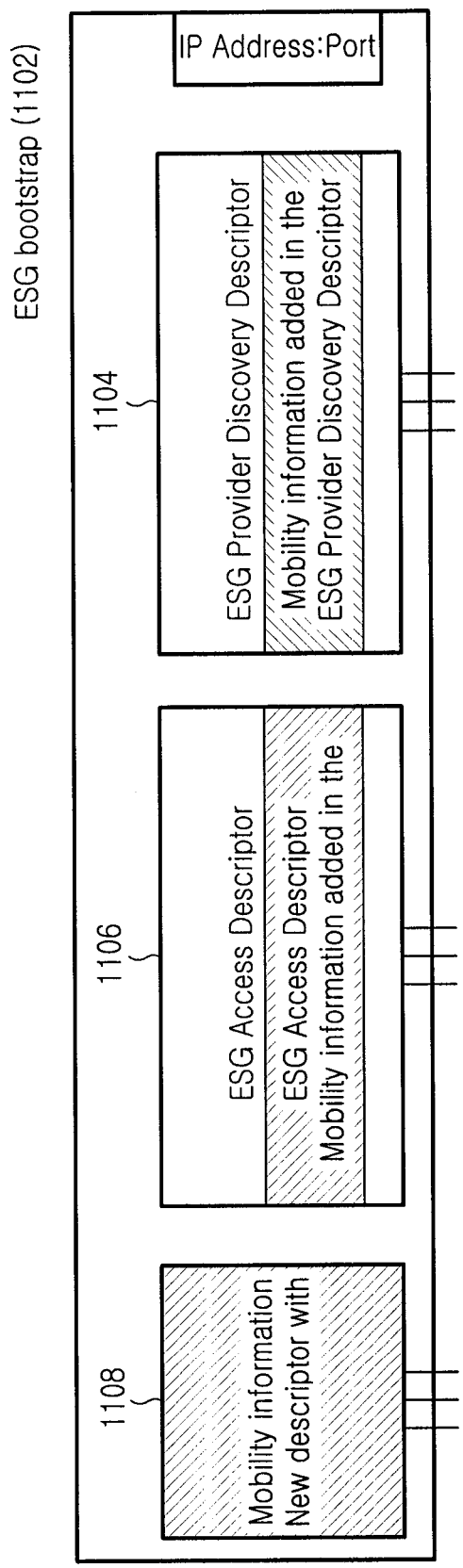
FIGS. 11a and 11b show examples of using a bootstrap session to deliver mobility information according to an exemplary embodiment of the present invention.

Before accessing the ESG announcement carousel session, the terminal acquires mobility information by means of an ESG bootstrap session 1102, which carries basic information regarding the ESG, as shown in FIG. 11a. If an independent ESG bootstrap session exists for each IP platform, the mobility information may be indicated with regard to each ESG, each ESG provider, or each IP platform.

3.1 Mobility Information Regarding Each ESG

Mobility information regarding each ESG is either added to an ESG access descriptor 1106 and/or an ESG provider discovery descriptor 1104, which are transmitted by means of the ESG bootstrap session 1102, or recorded in a new independent descriptor 1108.

3.2. Mobility Information Regarding Each ESG Provider

Mobility information regarding each ESG provider is added to the ESG provider discovery descriptor 1104 on the ESG bootstrap session 1102, or to the independent descriptor 1108.

3.3. Mobility Information Regarding Each IP Platform

Mobility information regarding each IP platform is added to the independent descriptor 1108 or to the PSI/SI signal.

Figure 11B:
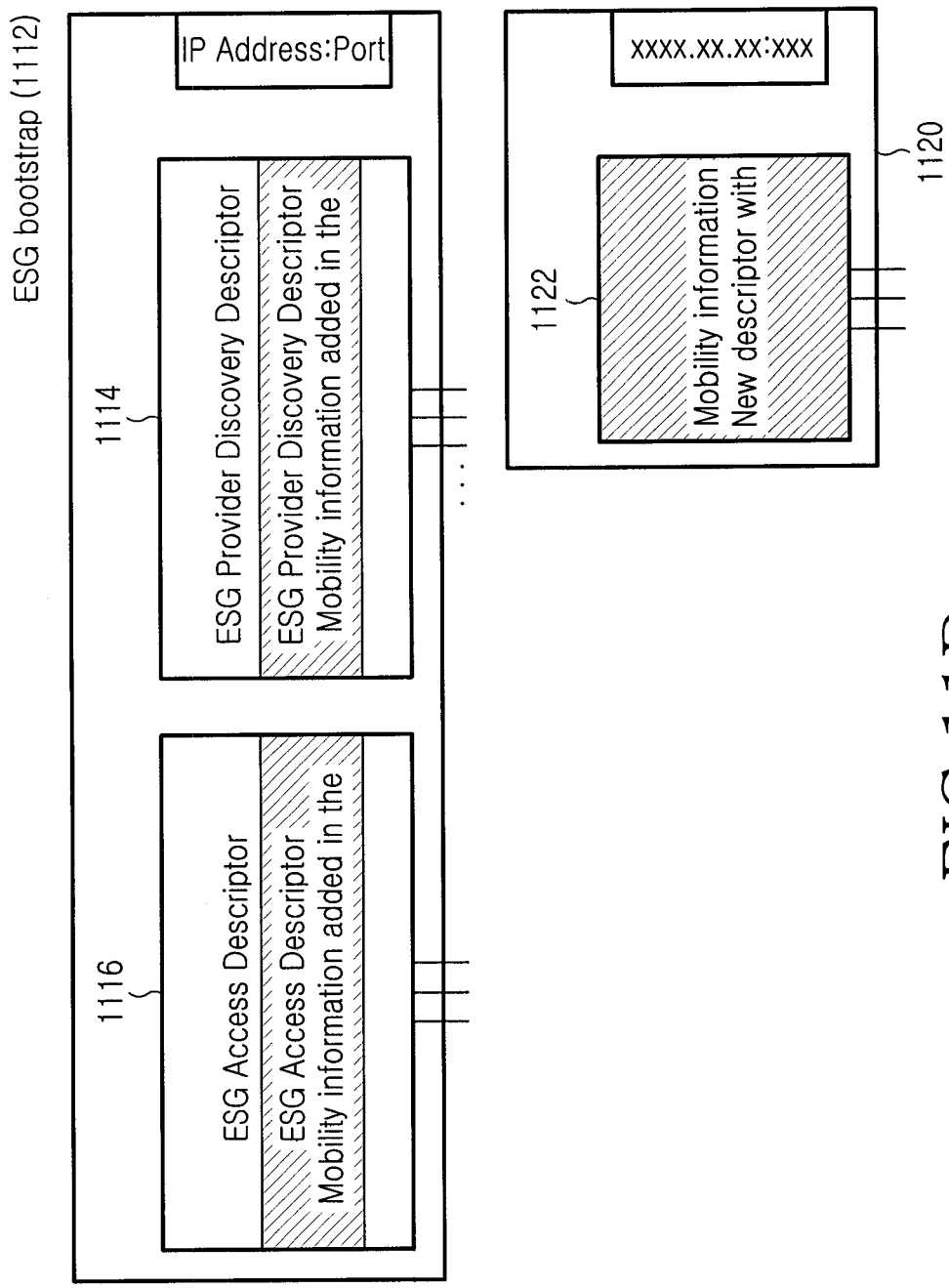

According to an alternative embodiment, as shown in FIG. 11b, the mobility information is recorded in a descriptor 1122, which is transmitted by means of a FLUTE session 1120 different from the existing ESG bootstrap session 1112. The same or additional mobility information may be transmitted by an ESG provider discovery descriptor 1114 and/or an ESG access descriptor 1116 on the ESG bootstrap session 1112.

Figure 12:
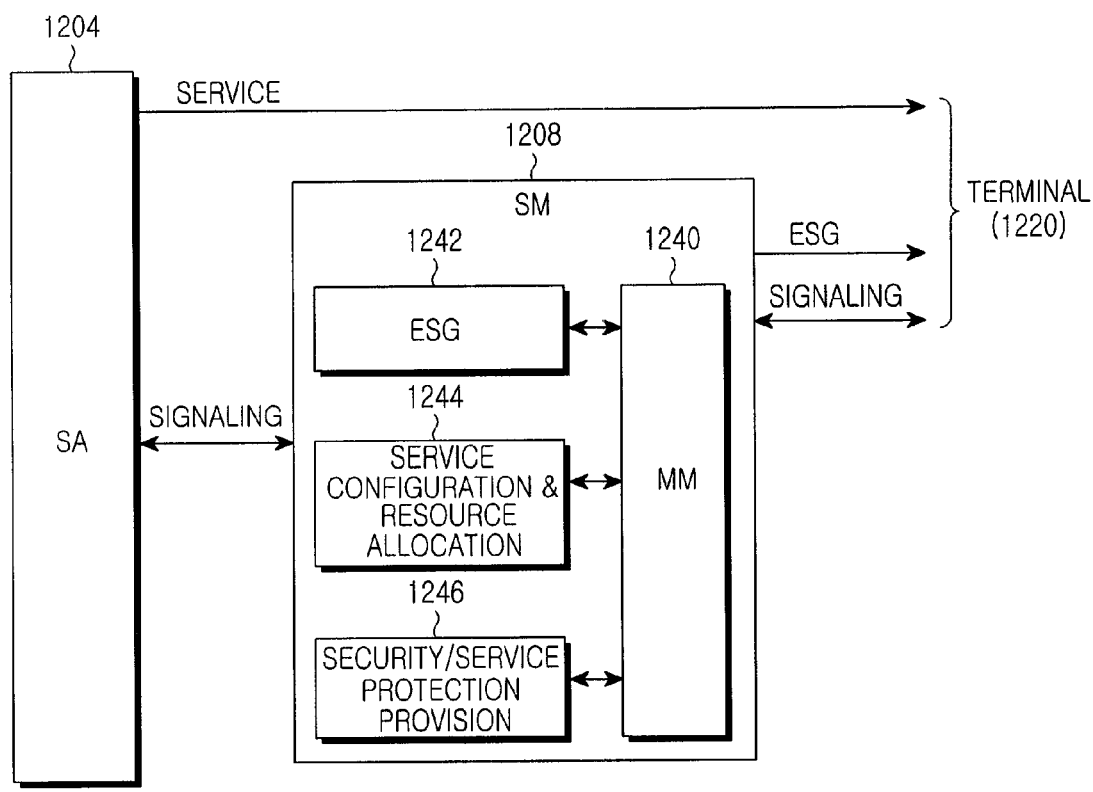
FIG. 12 is a block diagram showing the structure of a network device according to an exemplary embodiment of the present invention.

FIG. 12 shows the structure of a network according to an exemplary embodiment of the present invention. For convenience, FIG. 12 solely shows entities for conducting logical functions in the SM of the visited and home networks in connection with the exemplary embodiment of the present invention.

Referring to FIG. 12, the SA block 1204 aggregates relevant metadata and broadcasting contents from a number of sources in order to provide a specific service, and creates service data. The SA block 1204 encodes the service data in a format that the terminal 1220 can understand, and provides the terminal 1220 with it by using either streaming or file carousel delivery. The SA block 1204 creates metadata including a service description to be used for the ESG.

Inside the SM block 1208, there exist an ESG entity 1242, a service configuration & resource allocation entity 1244, a security/service protection provision entity 1246, and an MM (Mobility Management) block 1240. The ESG entity 1242 is adapted to create an ESG based on the metadata from the SA block 1204 and transmit it. The ESG includes mobility information in the above-mentioned format in order to support the handover and/or roaming of the terminal 1220. If the ESG for transmitting the mobility information is replaced with another means (e.g. notification message or independent signaling message), the SM block 1208 or the SA block 1204 includes a transmission entity for inserting the mobility information into the message and transmitting it.

The service configuration & resource allocation entity 1244, which is adapted for service configuration and network resource allocation, communicates with the SA block 1204 to contend the bandwidth of the broadcast bearer. In addition, the service configuration & resource allocation entity 1244 allocates services at a location on the broadcasting network topology, or determines the service bandwidth, and schedules the service time. The security/service protection provision entity 1246 is in charge of security, authentication, service protection, and service provision. These entities 1242-1246 are connected with the MM block 1240 to conduct functions necessary for the handover and roaming. The MM block 1240 conducts tasks related to the mobility of the terminal 1220, particularly the handover and roaming.

Figure 13:
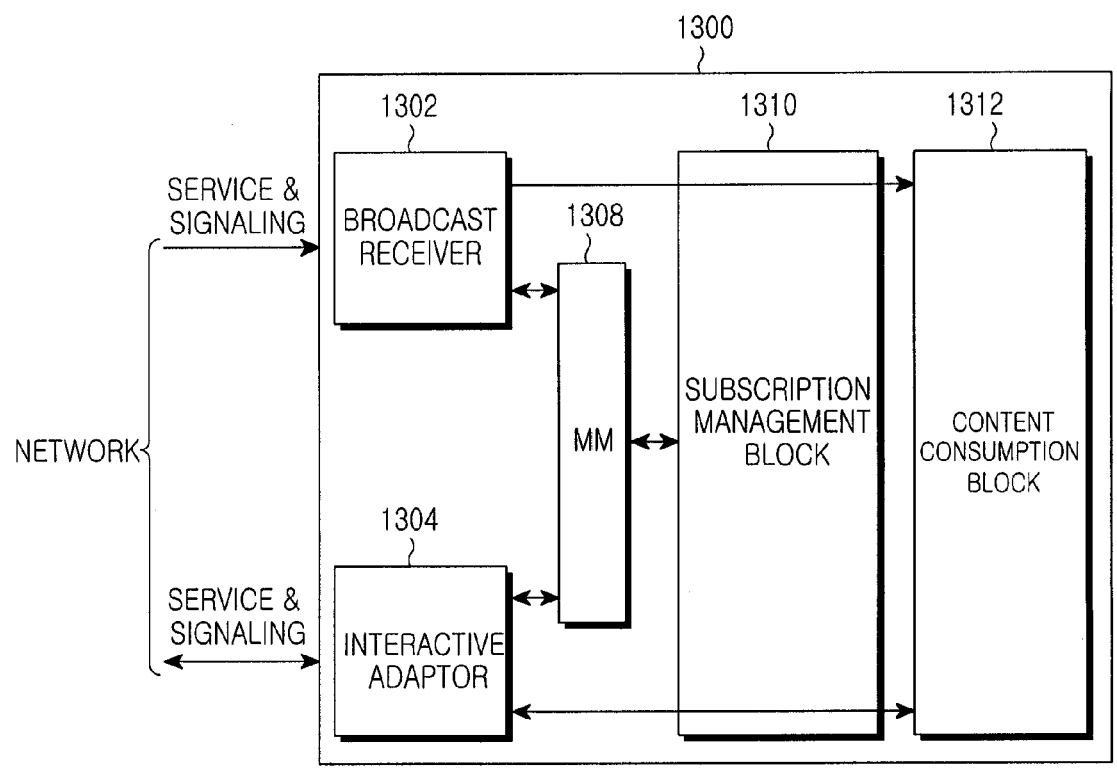
FIG. 13 is a block diagram showing the structure of a terminal device according to an exemplary embodiment of the present invention.

FIG. 13 shows the structure of a terminal receiver according to an exemplary embodiment of the present invention.

Referring to FIG. 13, the receiver 1300 has not only a broadcast receiver 1302 capable of receiving broadcasting signals from the broadcasting network, but also an interactive adaptor 1304 capable of accessing the interactive network. The broadcast receiver 1302 receives service data or signaling information from the broadcasting network. The interactive adaptor 1304 exchanges service data or signaling information with the interactive network. The MM block 1308 interworks with the MM block 1204 of the network to process the above-mentioned operations regarding the handover and roaming.

At least one of the devices 1302 and 1304 receives an ESG, detects mobility information of the above-mentioned format, and sends the mobility information to the MM block 1308. The MM block 1308 is connected with a subscription management block 1310, which is in charge of the management/acquisition of the right of the terminal regarding service subscription and the decryption of service contents, as well as with a content consumption block 1312 for providing the user with audios and videos in connection with the broadcasting service, and processes handover/roaming-related operations.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting mobility information to support handover and roaming in a Convergence of Broadcasting and Mobile Services (CBMS) system, the method comprising the steps of:
    setting mobility information comprising information elements for indicating a handover/roaming type according to whether or not support of an interactive network is available for handover/roaming;
    inserting the mobility information into at least one of an Electronic Service Guide (ESG) regarding broadcasting services, a notification message indicating the handover/roaming type, and a handover signaling message so that the mobility information is transmitted to at least one terminal; and
    conducting handover or roaming of the terminal according to the mobility information, wherein the handover/roaming type indicates an information element regarding if the interactive network is available for handover/roaming, an information element regarding if signaling information or service data can be delivered over the interactive network, and an information element regarding which of the network and the terminal makes a handover/roaming decision.

2. The method as claimed in claim 1, wherein the mobility information comprises at least one of interactive network information indicating characteristics of the interactive network, interactive network signaling information regarding if signaling information regarding handover/roaming can be transmitted over the interactive network, and information regarding service delivery over the interactive network indicating if service data regarding a broadcasting service can be delivered over the interactive network.

3. The method as claimed in claim 2, wherein the mobility information indicates the handover/roaming type using control type information indicating at least one of passive handover/roaming, terminal control handover/roaming with network support, handover/roaming controlled by both the terminal and the network, and network control handover/roaming.

4. The method as claimed in claim 3, wherein the mobility information further comprises related material information indicating an address of a server, additional information regarding handover/roaming being available from the server.

5. The method as claimed in claim 2, wherein the mobility information further comprises at least one of network control availability information indicating if network control is available to conduct handover/roaming and network control necessity information indicating if the network control is mandatory.

6. The method as claimed in claim 2, wherein the interactive network information comprises at least one of an address of an interactive network provider, a type of the interactive network, an acquisition reference indicating an access parameter, an Internet Protocol (IP) address of the interactive network, and a port number of the interactive network.

7. A network device for transmitting mobility information to support handover and roaming in a Convergence of Broadcasting and Mobile Services (CBMS) system, the network device comprising:
    a transmitter for setting mobility information comprising information elements for indicating a handover/roaming type according to whether or not support of an interactive network is available for handover/roaming, the transmitter inserting the mobility information into at least one of an Electronic Service Guide (ESG) regarding broadcasting services, a notification message indicating the handover/roaming type, and a handover signaling message so that the mobility information is transmitted to at least one terminal; and
    a processor for managing handover or roaming of the terminal according to the mobility information,
    wherein the handover/roaming type indicates an information element regarding if the interactive network is available for handover/roaming, an information element regarding if signaling information or service data can be delivered over the interactive network, and an information element regarding which of the network and the terminal makes a handover/roaming decision.

8. The network device as claimed in claim 7, wherein the mobility information comprises at least one of interactive network information indicating characteristics of the interactive network, interactive network signaling information regarding if signaling information regarding handover/roaming can be transmitted over the interactive network, and information regarding service delivery over the interactive network indicating if service data regarding a broadcasting service can be delivered over the interactive network.

9. The network device as claimed in claim 8, wherein the mobility information indicates the handover/roaming type using control type information indicating at least one of passive handover/roaming, terminal control handover/roaming with network support, handover/roaming controlled by both the terminal and the network, and network control handover/roaming.

10. The network device as claimed in claim 9, wherein the mobility information further comprises related material information indicating an address of a server, additional information regarding handover/roaming being available from the server.

11. The network device as claimed in claim 8, wherein the mobility information further comprises at least one of network control availability information indicating if network control is available to conduct handover/roaming and network control necessity information indicating if the network control is mandatory.

12. The network device as claimed in claim 8, wherein the interactive network information comprises at least one of an address of an interactive network provider, a type of the interactive network, an acquisition reference indicating an access parameter, an Internet Protocol (IP) address of the interactive network, and a port number of the interactive network.

13. A method for receiving mobility information to support handover and roaming in a Convergence of Broadcasting and Mobile Services (CBMS) system, the method comprising the steps of:
    receiving mobility information comprising information elements for indicating a handover/roaming type according to whether or not support of an interactive network is available for handover/roaming using at least one of an Electronic Service Guide (ESG) regarding broadcasting services, a notification message indicating the handover/roaming type, and a handover signaling message; and
    conducting handover or roaming of a terminal according to the mobility information, wherein the handover/roaming type indicates an information element regarding if the interactive network is available for handover/roaming, an information element regarding if signaling information or service data can be delivered over the interactive network, and an information element regarding which of the network and the terminal makes a handover/roaming decision.

14. The method as claimed in claim 13, wherein the mobility information comprises at least one of interactive network information indicating characteristics of the interactive network, interactive network signaling information regarding if signaling information regarding handover/roaming can be transmitted over the interactive network, and information regarding service delivery over the interactive network indicating if service data regarding a broadcasting service can be delivered over the interactive network.

15. The method as claimed in claim 14, wherein the mobility information indicates the handover/roaming type using control type information indicating at least one of passive handover/roaming, terminal control handover/roaming with network support, handover/roaming controlled by both the terminal and the network, and network control handover/roaming.

16. The method as claimed in claim 15, wherein the mobility information further comprises related material information indicating an address of a server, additional information regarding handover/roaming being available from the server.

17. The method as claimed in claim 14, wherein the mobility information further comprises at least one of network control availability information indicating if network control is available to conduct handover/roaming and network control necessity information indicating if the network control is mandatory.

18. The method as claimed in claim 14, wherein the interactive network information comprises at least one of an address of an interactive network provider, a type of the interactive network, an acquisition reference indicating an access parameter, an Internet Protocol (IP) address of the interactive network, and a port number of the interactive network.

19. A terminal device for receiving mobility information to support handover and roaming in a Convergence of Broadcasting and Mobile Services (CBMS) system, the terminal device comprising:
 a receiver for receiving mobility information comprising information elements for indicating a handover/roaming type according to whether or not support of an interactive network is available for handover/roaming using at least one of an Electronic Service Guide (ESG) regarding broadcasting services, a notification message indicating the handover/roaming type, and a handover signaling message; and
 a processor for conducting handover or roaming of a terminal according to the mobility information,
 wherein the handover/roaming type indicates an information element regarding if the interactive network is available for handover/roaming, an information element regarding if signaling information or service data can be delivered over the interactive network, and an information element regarding which of the network and the terminal makes a handover/roaming decision.

20. The terminal device as claimed in claim 19, wherein the mobility information comprises at least one of interactive network information indicating characteristics of the interactive network, interactive network signaling information regarding if signaling information regarding handover/roaming can be transmitted over the interactive network, and information regarding service delivery over the interactive network indicating if service data regarding a broadcasting service can be delivered over the interactive network.

21. The terminal device as claimed in claim 20, wherein the mobility information indicates the handover/roaming type using control type information indicating at least one of passive handover/roaming, terminal control handover/roaming with network support, handover/roaming controlled by both the terminal and the network, and network control handover/roaming.

22. The terminal device as claimed in claim 21, wherein the mobility information further comprises related material information indicating an address of a server, additional information regarding handover/roaming being available from the server.

23. The terminal device as claimed in claim 20, wherein the mobility information further comprises at least one of network control availability information indicating if network control is available to conduct handover/roaming and network control necessity information indicating if the network control is mandatory.

24. The terminal device as claimed in claim 20, wherein the interactive network information comprises at least one of an address of an interactive network provider, a type of the interactive network, an acquisition reference indicating an access parameter, an Internet Protocol (IP) address of the interactive network, and a port number of the interactive network.

* * * * *